United States Patent [19]
Zinevitch

[11] Patent Number: 6,081,599
[45] Date of Patent: Jun. 27, 2000

[54] SAW TELEVISION SCRAMBLING SYSTEM

[75] Inventor: Victor M. Zinevitch, Voronezh, Russian Federation

[73] Assignees: Tresness Irrevocable Patent Trust, Syracuse, N.Y.; Telecom, Voronezh, Russian Federation

[21] Appl. No.: 08/980,682

[22] Filed: Dec. 1, 1997

[51] Int. Cl.[7] .................................................. H04N 7/167
[52] U.S. Cl. ........................................................ 380/210
[58] Field of Search .................................. 380/10, 14, 20, 380/210, 216, 218, 219; 386/46

[56] References Cited

U.S. PATENT DOCUMENTS

| | | | |
|---|---|---|---|
| Re. 34,720 | 9/1994 | Zelenz ......................................... | 380/7 |
| 3,729,576 | 4/1973 | Court ........................................... | 178/5.1 |
| 3,952,260 | 4/1976 | Prochazka et al. ....................... | 330/149 |
| 4,074,311 | 2/1978 | Tanner et al. ............................. | 358/118 |
| 4,099,203 | 7/1978 | Garodnick et al. ...................... | 358/118 |
| 4,222,067 | 9/1980 | Stern et al. ............................... | 358/118 |
| 4,338,628 | 7/1982 | Payne et al. .............................. | 358/120 |
| 4,398,215 | 8/1983 | Osaka ........................................ | 358/120 |
| 4,488,183 | 12/1984 | Kinjo ........................................ | 358/319 |
| 4,527,195 | 7/1985 | Cheung .................................... | 358/120 |
| 4,623,918 | 11/1986 | Chomet .................................... | 358/118 |
| 4,628,358 | 12/1986 | Robbins ................................... | 358/121 |
| 4,639,777 | 1/1987 | Mori .......................................... | 358/120 |
| 4,748,667 | 5/1988 | Farmer et al. ............................ | 380/7 |
| 4,811,097 | 3/1989 | Ritter et al. .............................. | 358/160 |
| 4,839,922 | 6/1989 | Imasaki et al. ........................... | 380/15 |
| 4,903,297 | 2/1990 | Rist et al. ................................. | 380/7 |
| 4,959,717 | 9/1990 | Faroudja .................................. | 358/147 |
| 5,068,893 | 11/1991 | West et al. ................................ | 380/7 |
| 5,091,935 | 2/1992 | Meriwether et al. ..................... | 380/15 |
| 5,185,793 | 2/1993 | Marland et al. .......................... | 380/5 |
| 5,418,578 | 5/1995 | Culling .................................... | 348/731 |
| 5,430,498 | 7/1995 | Ta et al. .................................... | 348/608 |
| 5,446,795 | 8/1995 | Devries et al. ........................... | 380/13 |
| 5,742,357 | 4/1998 | Griesbaum ............................... | 348/731 |

OTHER PUBLICATIONS

"Saw Notch Filters", C.S. Hartmann, J.C. Andle and M. B. King, 1987 Ultrasonics Symposium.

*Primary Examiner*—Tod R. Swann
*Assistant Examiner*—Trevor Quick Coddington
*Attorney, Agent, or Firm*—Trapani & Molldrem

[57] ABSTRACT

A television scrambling system in which a television signal is scrambled by means of placing a scrambling (or jamming) signal into the luminance signal spectrum on the transmit side. On the receive side, the jamming signal is removed by a Surface Acoustic Wave (SAW) notch filter. On the transmit side, pre-correction of the television signal is performed to compensate for amplitude and phase distortions introduced by the SAW notch filter. The pre-correction includes: inverting the television signal as a function of time; pre-distorting the phase of the time-inverted television signal in accordance with the phase response of the SAW notch filter; pre-emphasizing the time-inverted television signal using a first amplitude corrector having a phase response; restoring the television signal to a time uninverted state, such that the phase of the restored television signal is pre-distorted in accordance with the inverse of the SAW notch filter phase response; and pre-emphasizing the restored television signal using a second amplitude corrector having a phase response which is substantially equivalent to the phase response of the first amplitude corrector.

31 Claims, 13 Drawing Sheets

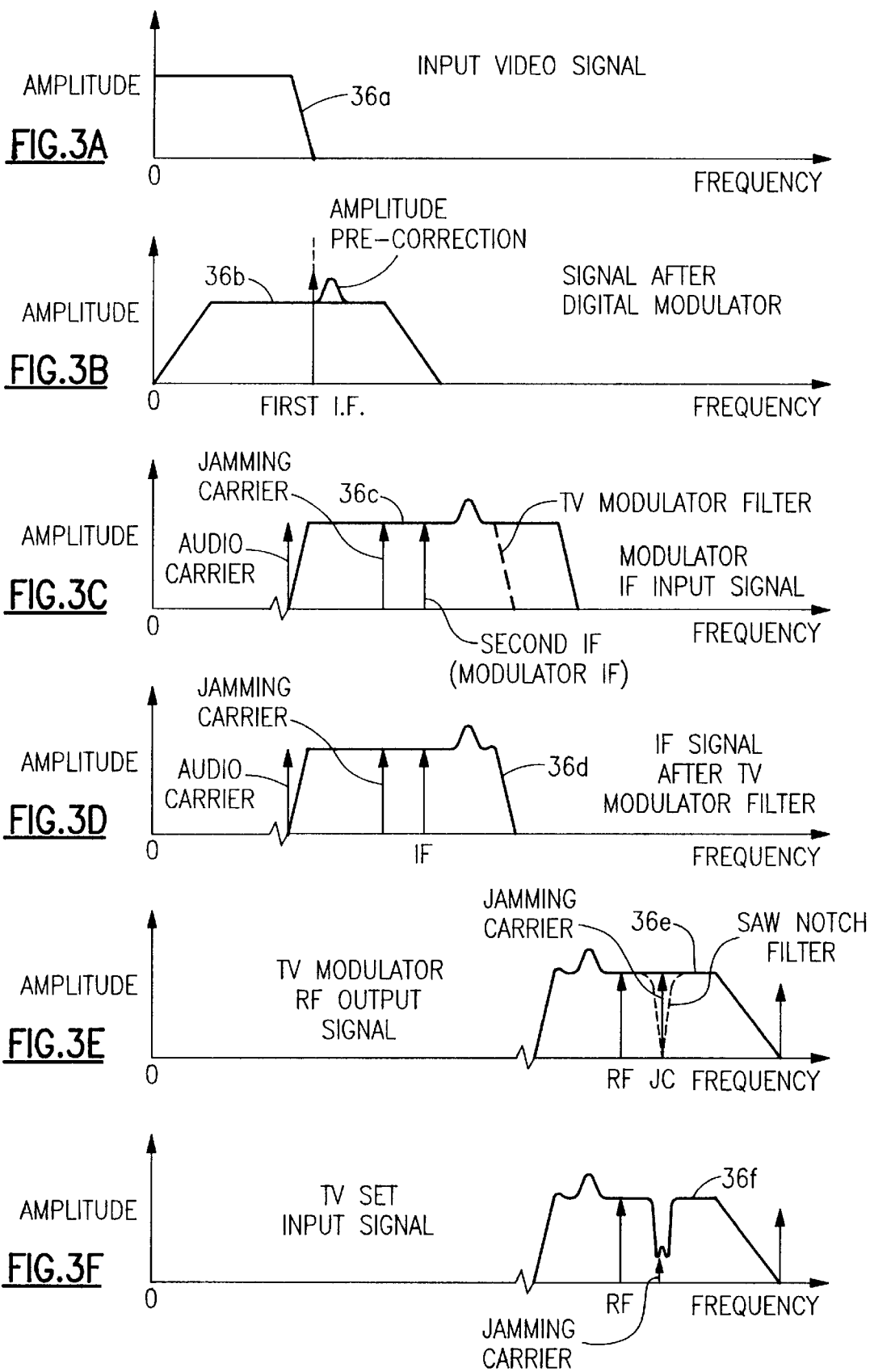

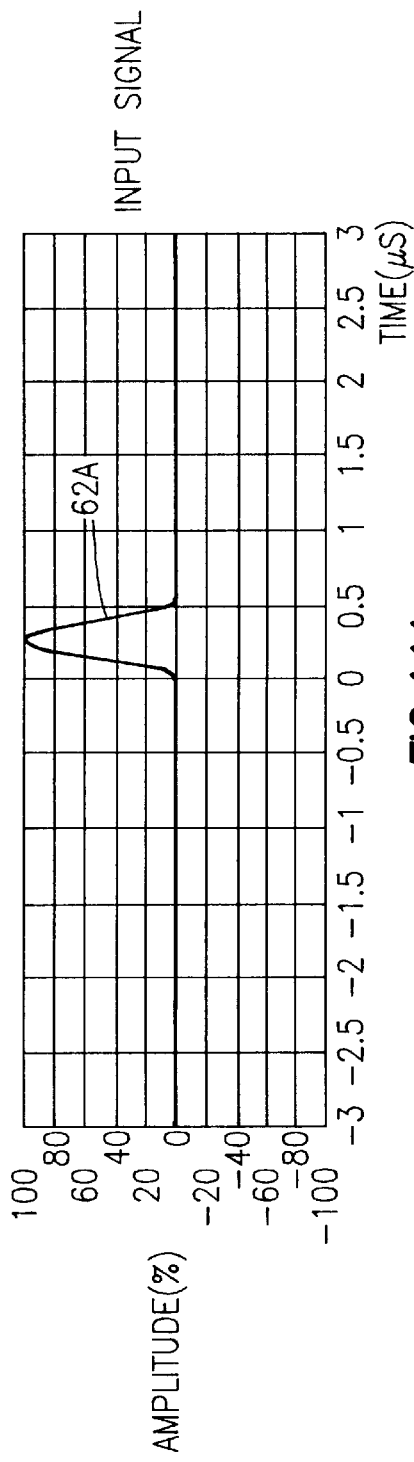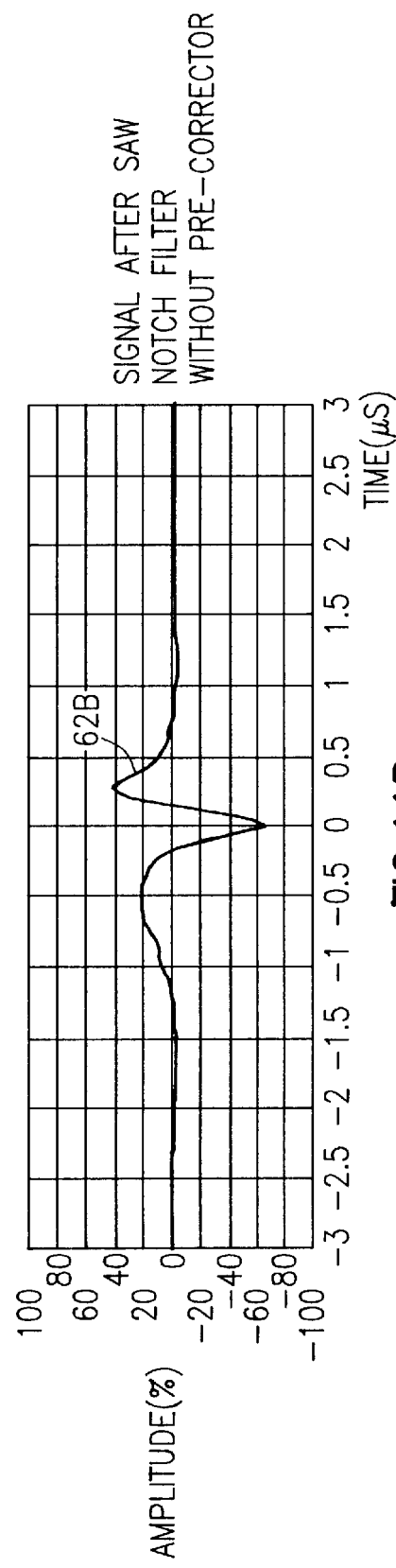

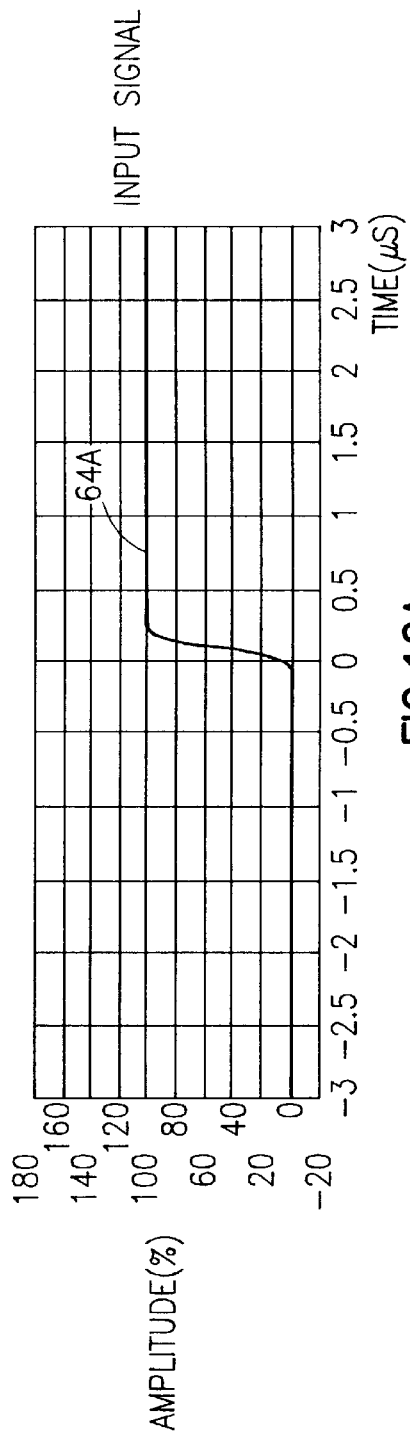
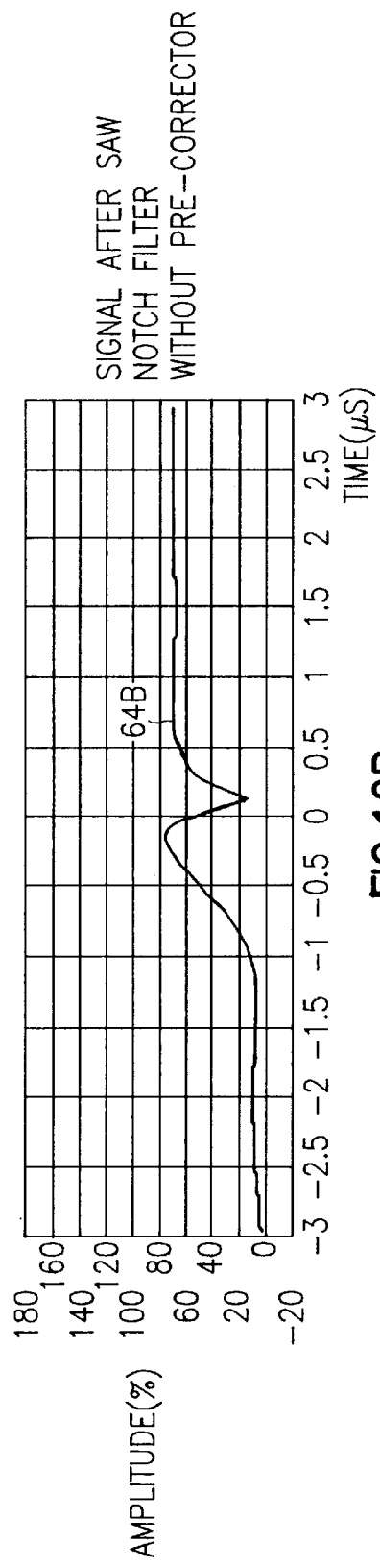

SAW TELEVISION SCRAMBLING SYSTEM

BACKGROUND OF THE INVENTION

1. Technical Field

The present invention relates generally to CATV program security systems, and more particularly to television scrambling systems employing SAW notch filters.

2. Background Art

There is known a scrambling system described in U.S. Pat. No. 4,074,311 to Tanner et al., wherein the scrambling process is performed by inserting a jamming carrier into the TV signal spectrum between the audio and video carriers, on the transmit or headend side, and descrambling is implemented by means of a notch filter which removes the jamming carrier on the receive side.

The Tanner system has a number of drawbacks. First, although the central spectral components of the scrambled TV signal are pre-amplified on the transmit side, a significant portion of the TV signal spectrum is removed during descrambling on the receive side. This drawback causes blurring and is highly perceptible when transmitting text which spectrum includes RF components, as well as when transmitting a scrambled signal at high frequencies as that results in a broadening of the notch in the descrambling filter.

Another disadvantage of the Tanner system is that a jamming carrier is offset far from the picture carrier in frequency, and the notch filter is realized using LC-components, both aspects of which make the system relatively easy to defeat by unauthorized subscribers.

Further, the Tanner system cannot be practically implemented in a coded jamming system, as proposed in U.S. Pat. No. 4,623,918 to Chomet, because the notch filter in Tanner removes too much of the TV signal spectrum when removing the jamming carrier. A coded jamming system involves placing more than one jamming carrier in the TV signal spectrum, or placing a single jamming carrier at one of a plurality of assigned locations in the TV signal spectrum. A coded system is theoretically more secure than the system proposed in Tanner et al., but, heretofore, has not been realizable in a practical and economical scrambling system.

There is also known a scrambling system proposed in U.S. Pat. No. Re. 34,720 to Zelenz, wherein the TV signal spectrum is distorted by a filter whose amplitude-frequency characteristic is shaped like a Gaussian curve. This system offers significant improvement in TV picture quality over the Tanner et al. system; however, the system is not designed for a coded jamming implementation.

There is a scrambling system introduced in U.S. Pat. No. 4,748,667 to Farmer et. al. and U.S. Pat. No. 5,068,893 to West et al., wherein a jamming signal is placed in the vestigial sideband (VSB) of the TV signal and a SAW notch filter is employed to remove it. Distortions introduced by the SAW notch filter are compensated by suppression of the TV signal spectrum in the vestigial sideband (VSB) and amplification of the spectrum in the main sideband (MSB). The jamming signal is placed very close to the picture carrier in the VSB, and the narrow-band SAW notch filter removes it upon descrambling.

In theory, the Farmer/West system offers greater program security than the Tanner system. However, for efficient scrambling, the jamming signal should be offset from the picture carrier no more than 300 kHz in the VSB, otherwise it will be suppressed by the TV receiver. Within the 300 kHz offset, the SAW notch filter introduces phase distortions into TV signal. The compensation technique proposed in Farmer et al. and West is only suitable for compensating distortion due to the low frequency branch of the SAW filter's group delay characteristic. The distortion due to the high-frequency branch of the group delay, where the picture carrier and nearby TV signal spectrum fall, is not compensated by this technique. This results in low-frequency distortions to the TV picture after descrambling with the SAW notch filter. Furthermore, this proposed system is not suitable for a coded jamming implementation.

There is a scrambling system proposed in U.S. Pat. No. 4,903,297 to Rist et al., wherein the scrambling process is executed by means of placing a jamming signal into both the MSB VSB, and applying a SAW notch filter for descrambling. On the transmit side, the TV signal distortions introduced by the SAW notch filter are compensated by amplitude and phase pre-correction of the TV signal. Pre-correction is accomplished by means of amplifier, or by serial amplifiers, with negative feedback containing the same SAW notch filter applied for descrambling on the receive side.

Despite pre-correction of phase and amplitude in the Rist system, optimum TV picture quality is not achieved in practice because of incomplete compensation of the phase and amplitude distortions introduced by the SAW notch filter. Phase and amplitude compensation is incomplete because ideal pre-correction (i.e., the inverse of the amplitude and phase characteristics of the SAW notch filter) can only be achieved with an infinitely large gain factor of the amplifier, enveloped by negative feedback. The slope of the phase-frequency characteristic of the SAW notch filter is very steep within the notch frequency region; thus, when such a filter is switched into the negative feedback circuit of the amplifier, the latter will go into self-oscillation. Stable operation is only assured when the gain factor is small, but that results in less than ideal pre-correction of phase and amplitude.

OBJECTS AND SUMMARY OF THE INVENTION

It is therefore an object of the present invention to provide pre-correction apparatus and methods that avoid the aforementioned problems associated with the prior art.

It is another object of the present invention to provide a television scrambling system employing a SAW notch filter as a descrambler.

It is a further object of the present invention to provide a television scrambling system which compensates for phase and amplitude distortions introduced by the SAW notch filter descrambler.

It is still another object of the present invention to provide a television scrambling system which can be implemented as a coded scrambling system.

It is still a further object of the present invention to provide apparatus and methods for pre-correcting a television signal in a television scrambling system so that the amplitude and phase distortions introduced by a SAW filter descrambler are compensated.

It is still a further object of the present invention to provide apparatus and methods for distorting an electrical signal with an inverted phase response.

It is yet another object of the present invention to provide apparatus and methods for pre-emphasizing an electrical signal in a desired frequency band, without introducing appreciable phase distortion.

It is yet a further object of the present invention to provide apparatus and methods for inverting a digital television signal.

These and other objects are attained in accordance with the present invention, wherein there is provided an apparatus for processing a television signal in a television scrambling system of the type in which a scrambling signal is substantially removed by a notch filter having a phase response and a notch frequency response. The apparatus comprises a signal inverter, phase corrector, and signal restorer. The inverter inverts the television signal as a function of time; the phase corrector pre-distorts the phase of the time-inverted television signal in accordance with the phase response of the notch filter; and the signal restorer restores the television signal to a time uninverted state following pre-distortion by the phase corrector. The phase of the restored television signal is pre-distorted in accordance with the inverse of the phase response of the notch filter. As a result of this processing, phase distortion introduced by the notch filter is substantially compensated by the phase pre-distortion in the restored television signal.

In a further embodiment, the television signal processing apparatus of the present invention includes first and second amplitude correctors. In such an embodiment, the first amplitude corrector is coupled between the signal inverter and the signal restorer. The first amplitude corrector pre-emphasizes the time-inverted television signal in a frequency band determined by the notch frequency response of the notch filter. The second amplitude corrector is coupled to the output of the signal restorer. The second amplitude corrector pre-emphasizes the restored television signal in the frequency band determined by the notch frequency response. The second amplitude corrector has a phase response which is substantially equivalent to the phase response of the first amplitude corrector. As a result, the phase distortion introduced in the time-inverted television signal by the first amplitude corrector is substantially compensated by phase distortion introduced in the restored television signal by the second amplitude corrector. In addition, amplitude distortion introduced by the notch filter is substantially compensated by the pre-emphasis of the television signal by the first and second amplitude correctors.

Variations on the latter embodiment are contemplated by the present invention. For example, the first amplitude corrector could be placed before the time inversion of the television signal, and the second amplitude corrector could be made to operate on the time-inverted television signal, to achieve the same phase compensation between amplitude correctors and the same amplitude compensation of the notch filter response.

While pre-correction of the television signal, for phase and amplitude, can be accomplished at baseband, IF, or RF, it is contemplated for the preferred embodiment that such pre-correction be performed at IF, in a digital implementation. In such an embodiment, an analog-to-digital (A/D) converter converts an analog TV video signal to a digital TV video signal. A digital modulator is coupled to the A/D converter, and generates from the TV video signal a digital IF TV signal. A signal inverter is coupled to the digital modulator, and inverts the digital IF signal as a function of time. A phase corrector is coupled to the signal inverter, and pre-distorts the phase of the time-inverted digital IF signal in accordance with the phase response of the SAW notch filter. A signal restorer restores the digital IF signal to a time uninverted state following pre-distortion in the phase corrector. A digital-to-analog converter is coupled to the signal restorer for converting the restored digital IF signal to analog form. As a result of this processing, the phase of the restored digital IF signal is pre-distorted in accordance with the inverse of the phase response of the SAW notch filter, such that the phase distortion of the SAW notch filter is substantially compensated.

In the digital IF embodiment, the system may further comprise first and second digital amplitude correctors, which perform the functions already described with respect to the first, above-mentioned general embodiment.

The present invention further contemplates an embodiment that operates on an electrical signal, in general (i.e., not limited to a television signal). Such an embodiment is expressed in terms of apparatus and methods for distorting an electrical signal with an inverted phase response. Such an apparatus comprises the signal inverter, phase corrector, and signal restorer, described with respect to the previous embodiments.

The present invention also contemplates apparatus and methods for pre-emphasizing an electrical signal in a desired frequency band, without introducing appreciable phase distortion. Such apparatus and methods comprise the functions of: (1) inverting the electrical signal as a function of time; (2) pre-emphasizing the time-inverted electrical signal in the desired frequency band, using a first amplitude corrector having a phase response; (3) restoring the electrical signal to a time uninverted state; and (4) pre-emphasizing the restored electrical signal in the desired frequency band, using a second amplitude corrector having a phase response which is substantially equivalent to the phase response of the first amplitude corrector. As a result of these steps, phase distortion introduced in the time-inverted electrical signal by the first amplitude corrector is substantially compensated by phase distortion introduced in the restored electrical signal by the second amplitude corrector.

Another method of the present invention merely concerns inverting a digital television signal which has a series of digital TV signal fields. Such a method comprises the steps of: (1) reading the digital TV signal fields into a FILO memory unit; and (2) reading the digital TV signal fields out of the FILO memory unit. The steps of reading the digital TV signal fields into and out of the FILO memory unit are performed in accordance with a FILO algorithm.

In accordance with the present invention, the scrambling of a TV signal is implemented at the headend by placing a jamming carrier into the signal spectrum at the intermediate frequency (IF) of the TV headend modulator. The jamming carrier may be located in the VSB or in the MSB, which allows for the implementation of a coded jamming system. The TV signal is subjected to pre-correction to produce phase and amplitude signal distortions which compensate for the distortions of the signal on the receive side, by a SAW notch filter acting as a descrambler.

At the headend, pre-correction is preferably implemented with the use of a digital signal processor, which converts an input signal to the digital form by means of analog-to-digital (A/D) converter. The A/D converter's digitization frequency should be selected more than 3.5 times as large as the upper frequency of TV video signal. The TV video signal is carried to the first IF by the digital modulator whose second input is supplied with the coefficients of the first IF sinusoidal signal. The first IF is to be set up over the upper frequency of the TV video signal, and should not be greater than 1/3.5 of the A/D converter's digitization frequency. This results in an amplitude modulated TV signal with 85% depth, negative polarity, and two sidebands at the digital modulator output.

The modulated signal is then subjected to filtration/pre-compensation and to analog conversion, and is carried to the second IF which equals the TV headend modulator IF. At the modulator IF, the pre-corrected signal is combined with the jamming carrier and the audio carrier. The audio carrier is extracted from the modulator IF output by means of a pass-band filter. The combined signal then proceeds to the IF input of TV modulator.

With signal pre-correction at the first IF, the phase response is inverse to phase distortions inserted into the TV signal by a SAW notch filter. Amplitude pre-correction represents pre-emphasis (e.g., pre-amplification) of the signal spectral components which, when translated to RF, are located in the frequency band opposite to the one where the SAW notch filter suppresses the same spectral components of the TV signal. By this, such narrowband pre-emphasis has a linear and flat phase characteristic. The result will be substantially complete compensation of the distortions inserted by the SAW notch filter, resulting in superior quality of the TV output signal and TV picture.

The desired amplitude and phase characteristic of the pre-corrector is achieved by an algorithm consisting of the following stages:

(1) the first series time inversion of the signal fields of the first IF performed by means of reading the fields in and out of two FILO (First In-Last Out) memories. This process is run by a controller. From the video input signal, a SYNC Separator extracts vertical sync pulses which synchronize moments of reading in and out;

(2) digital phase correction performed with the use of a filter-corrector from the range of non-minimal phase circuits. The filter-corrector has the same phase response curve as a SAW notch filter and an amplitude-frequency response of 0 dB;

(3) the first digital amplitude correction executed with the use of a filter-corrector whose peak amplitude characteristic is the square root of the value required for correction of the TV signal;

(4) the second series time inversion of the TV signal fields, which is also performed by means of alternate reading of the fields in and out of two other FILO memories which restore the initial time structure of TV signal; and (5) the second amplitude correction executed with the use of a filter-corrector having the same amplitude characteristic as the first amplitude correction.

The second amplitude correction can be performed in the digital form before the first time inversion, as well as in the analog form after TV signal conversion of the first IF in a digital-to-analog (D/A) converter. After the second time inversion, the phase pre-distortion introduced into the TV signal, between the first and second time inversions, becomes inverse, as it is known that sign reversal of the argument in the time domain changes the sign of the imaginary part (the phase) in the spectral domain. This results in the formation of a pre-corrector phase response which is inverse to the phase response of the SAW notch filter. Following the first amplitude correction and the second time inversion, the phase response is inverted in the same way. The result is that the phase responses of the first and second amplitude correctors become fully and mutually compensated, and their amplitude characteristics are combined, which results in the required amplitude characteristic for compensation of amplitude distortion of the SAW notch filter.

This method of signal inversion in time provides the required inverse phase characteristic by using a digital phase corrector of low order. Such an inverse phase characteristic, if produced directly, would require a filter of very high order—dozens of times higher than the order of the phase corrector in the proposed method, and such a high order filter is fairly difficult to implement. This advantage is extremely important with digital filtration of signals. In addition, this method of time inversion permits one to obtain a very narrowband burst of the amplitude-frequency response having linear phase, which ensures independent correction of both amplitude and phase. "There and back" field-by-field time inversion does not adversely affect the quality of the TV signal transmission as it has a corresponding periodic structure, and the moments of beginning and ending of the time inversion are during the vertical blanking pulses of the TV signal.

Thus, at the RF output of the TV modulator, there will be a TV signal scrambled by a jamming carrier whose amplitude and phase pre-correction compensate for the distortions introduced by the SAW notch filter used for descrambling on the receive end.

BRIEF DESCRIPTION OF THE DRAWINGS

Further objects of the present invention will become apparent from the following description of the preferred embodiments with reference to the accompanying drawing, in which:

FIGS. 3A–3F illustrate the amplitude spectrum of the TV signal at different points in the scrambling system of FIG. 1, at both the headend and receive end;

FIGS. 11A–11D are a series of waveform plots of a sine-squared video pulse before and after distortion by a SAW notch filter, without pre-correction (FIGS. 11A–11B) and with pre-correction (FIGS. 11C–11D);

FIGS. 12A–12D are a series of waveform plots of a step video pulse before and after distortion by a SAW notch filter, without pre-correction (FIGS. 12A–12B) and with pre-correction (FIGS. 12C–12D)

DETAILED DESCRIPTION OF THE PREFERRED EMBODIMENTS

Figure 1:
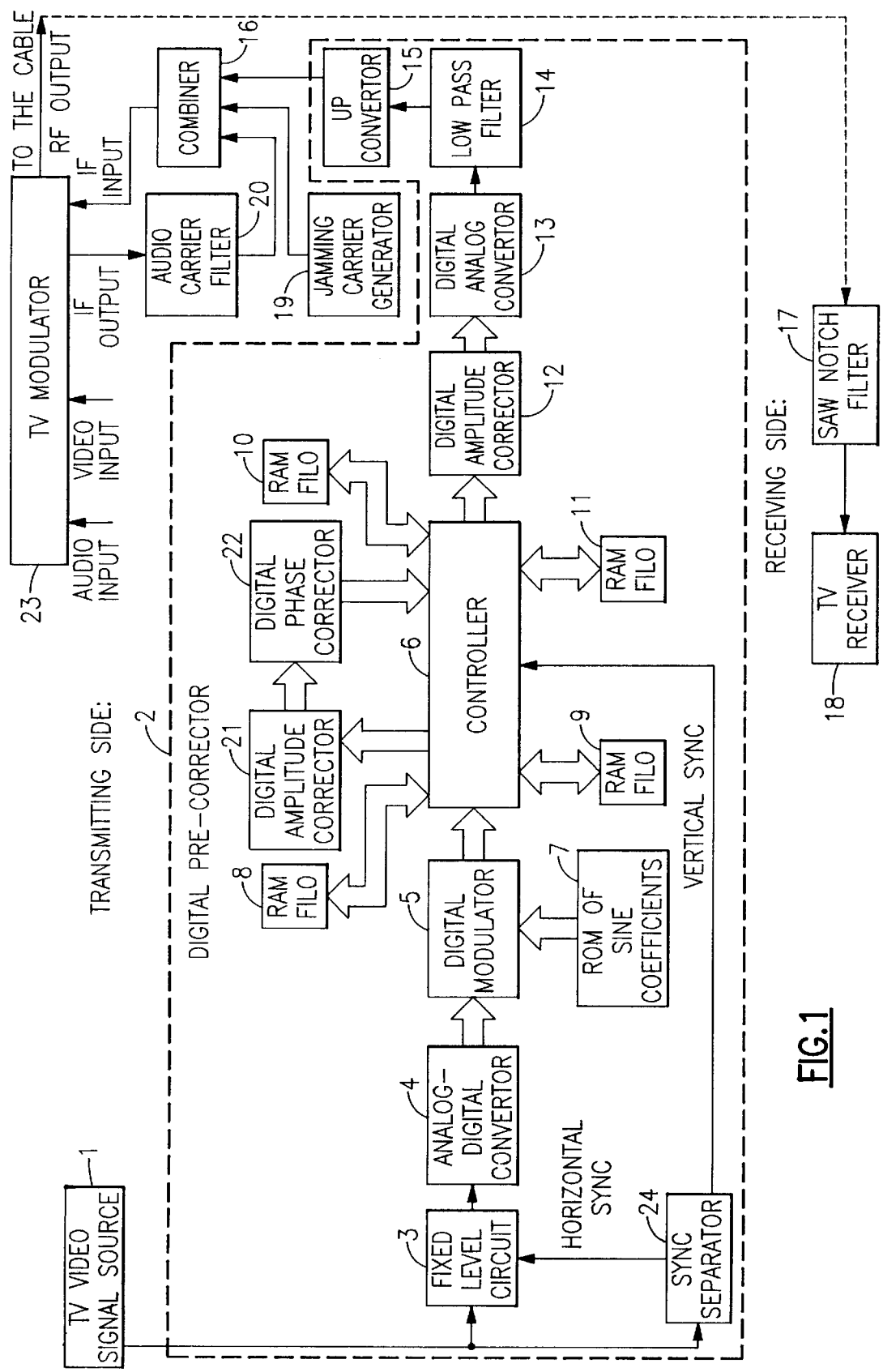
FIG. 1 is a block diagram of a SAW television scrambling system of the present invention.

With reference to FIG. 1, there is shown a block diagram of the Pay CATV scrambling system in accordance with the present invention. The diagram illustrates the embodiment where the first and second amplitude corrections are effected in the digital form. At the headend (or transmit side), the system comprises a video pre-corrector 2 whose input is coupled to the output of a TV signal source 1 and whose output is coupled to the IF input of a TV headend modulator 23, via a combiner 16. Two other inputs of combiner 16 are connected to the output of a jamming carrier generator 19 and the output of an audio carrier filter 20. The input of filter 20 is connected to the IF output of modulator 23. Thus, in combiner 16, the pre-corrected video signal is summed with the audio carrier and is scrambled by the jamming carrier.

From the output of signal source 1, the TV video signal goes to the input of digital pre-corrector 2, and is split into two signal paths—one path leads to the input of a fixed level circuit 3, and the other path leads to the input of a SYNC separator 24. The output of fixed level circuit 3 is coupled to the input of an analog-to-digital (A/D) converter 4. Fixed level circuit 3 fixes the black level of the video input signal at the input of A/D converter 4, which ensures that the video signal amplitude matches the dynamic range of A/D converter 4. The operation of circuit 3 is controlled by the horizontal sync pulses extracted from the video signal by separator 24.

The digitization frequency of A/D converter 4 should be set to more than 3.5 times the upper frequency of the TV video signal spectrum. For instance, in order to process TV signals under most TV standards, a good digitization frequency should be around 20 MHz.

From the output of A/D converter 4, the digital TV video signal is coupled to the input of a digital modulator 5, wherein a digital IF TV signal is generated therefrom. The digital TV video signal is transformed into an amplitude modulated IF signal of negative polarity, 85% depth, having two sidebands (See FIG. 3B). The digital IF TV signal is generated from a set of sine signal coefficients of the IF, which are introduced to digital modulator 5 from ROM 7. The IF frequency should be selected higher than the upper frequency of the TV video signal spectrum, but should not be greater 1/3.5 of the digitization frequency of A/D converter 4. In addition, the IF value should be a multiple of the digitization frequency harmonics, which permits the number of coefficients stored in ROM 7 to be minimized. For example, with a 20 MHz digitization frequency, an appropriate value for the IF could be 2×20 MHz/7=5.71 MHz. In this example, just seven coefficients in ROM 7 are enough to generate the IF signal.

With further reference to FIG. 1, the digital IF TV signal from digital modulator 5 is coupled to the input of a controller 6. Controller 6 sequentially and alternatively reads the input signal fields of the TV signal into and out of a RAM FILO unit 8 and RAM FILO unit 9 (i.e., when a signal is read in RAM 8, a signal is read out of RAM 9, and vice versa). Since readings in and out are executed in the return order, in accordance with a FILO algorithm, the read TV signal fields are inverted in time. Thus, controller 6 and RAM FILO units 8 and 9 constitute a TV signal inverter.

The time-inverted signal goes through a first digital amplitude corrector 21, a digital phase corrector 22, and, with the use of controller 6 which alternates reading TV signal fields into and out of a RAM FILO unit 10 and a RAM FILO unit 11, is then subjected to a second time inversion which restores the initial time structure to the signal. With reading in and out of RAM FILO units 8 and 9, the first and second time inversions are synchronized by vertical sync pulses coming from separator 24. The vertical sync pulses are located in the vertical blanking interval. Such synchronization, makes a TV signal break unseen in the TV picture on the TV screen. The delay-time of the second time inversions relative to the first time inversions is the same as the delay-time of signals in correctors 21 and 22. This provides precise "stitch" of the TV signal fields when restoring the initial time structure to the signal.

From the output of controller 6, the digital IF TV signal goes through a second digital amplitude corrector 12, and is then converted to the analog form in a digital-to-analog (D/A) converter 12. The bit resolution of each component in digital pre-corrector 2 is as follows: the output of A/D converter 4—10 bits; RAM FILO units 8, 9—10 bits; digital amplitude corrector 21—10 bit input and 16 bit output; digital phase corrector 22—16 bit input and 12 bit output; RAM FILO units 10, 11—12 bits; digital amplitude corrector 12—12 bit input and 12 bit output; and D/A converter 13—12 bit input.

After D/A converter 13, the analog IF signal is filtered by a low-pass filter 14 to eliminate upper harmonics of the IF signal. A frequency up-convertor 15 converts the IF signal to a second IF which equals the IF of TV modulator 23. The TV signal, now at the second IF, is then coupled to the input of combiner 16 and proceeds to the IF input of modulator 23.

With further reference to FIG. 1, on the receive side, the scrambling system includes a SAW notch filter 17 which acts as a descrambler. SAW filter 17 is coupled between the cable network and the input to a TV receiver 18. The SAW notch filters described in U.S. Pat. No. 4,748,667 to Farmer et. al. and U.S. Pat. No. 5,068,893 to West et al., and in the article "SAW Notch Filters" by Hartmann C. S. et al., Ultrasonics Symposium, 1987, can be used as the SAW notch filters in the scrambling system of the present invention.

The pre-correction of the TV signal in pre-corrector 2 is performed at the first IF by means of processing a signal with two sidebands in correctors 21, 22 and 12, and by means of the above described algorithm to achieve the first and second time inversions of the TV signal. The characteristic curve of phase corrector 22 is selected to coincide in shape with the phase response curve of SAW notch filter 17, and has the expression:

$$\dot{F}(w)=F(w)e^{jf(w)}=e^{jf(w)},$$

where F(w) is the amplitude characteristic of phase corrector 22, and equals 1; f(w) is the phase characteristic of corrector 22; and w is the frequency. This curve, which approximates the phase response of SAW notch filter 17, is implemented by means of cascading classical correctors of the second order. For existing SAW notch filters, two or three cascaded stages are enough.

The characteristics, $\dot{A}_1(w)$ and $\dot{A}_2(w)$, of amplitude correctors 21 and 12 should be equivalent, i.e., $$\dot{A}_1(w)=\dot{A}_2(w)=\sqrt{A(w)}e^{ja(w)},$$

where A(w) is the amplitude characteristic burst required for pre-correction, and a(w) is the phase characteristic of pre-correctors 21 and 12.

It should be noted that implementation of the amplitude characteristic burst without appreciable phase distortions is not feasible in the class of known circuits, while the phase characteristic burst with a linear amplitude characteristic is implemented in the class of non-minimal phase circuits. The characteristics $\dot{A}_1(w)=\dot{A}_2(w)$ required to compensate for amplitude distortions of SAW notch filter 17 are also implemented by means of cascading classical amplitude correctors of the second order. In fact, two cascaded stages are more than enough. In the spectral domain, the output signal of digital modulator 5 has the expression:

$$\dot{S}(w)=S(w)e^{j\phi(w)},$$

where S(w) is the amplitude spectrum and j(w) is the phase spectrum.

As it is known, the signal inverted in time is the complex conjugate of the initial signal. Thus, after the first time inversion, the signal will have the expression:

$$\dot{S}_{-t}(w)=S(\overset{*}{w})=S(w)e^{-j\phi(w)}.$$

After processing by correctors 21 and 22, the signal will have the expression:

$$\dot{S}_1(w)=S(w)e^{-j\phi(w)}e^{jf(w)}\sqrt{A(w)}e^{ja(w)}.$$

After the second time inversion, the signal is converted to the form of:

$$\dot{S}_{1-t}(w)=\dot{S}_1^*(w)=S(w)e^{j\phi(w)}e^{-jf(w)}\sqrt{A(w)}e^{-ja(w)}.$$

After processing by amplitude corrector 12, the resulting signal of the first IF will have a form of:

$$\dot{S}_{IF}(w)=\dot{S}_{1-t}(w)\sqrt{A(w)}e^{ja(w)}=S(w)e^{j\phi(w)}A(w)e^{-jf(w)}.$$

It is easy to notice that the described algorithm is equivalent to the one where the initial signal of the fist IF, $S(w)e^{j\phi(w)}$, is filtered by a filter which has the $A(w)e^{-jf(w)}$ characteristic. The effective phase characteristic of this filter is –f(w), i.e., the inverse of the phase characteristic of SAW notch filter 17. The amplitude characteristic A(w) is what is required to compensate for amplitude distortion of SAW filter 17, and the phase distortions a(w) introduced by the amplitude correctors are substantially cancelled.

It is preferred to perform pre-correction in pre-corrector 2 at IF, because the IF signal has two sidebands which are affected by the pre-correction and, as affected, translate to the two sidebands of the RF television signal which is distorted by SAW notch filter 17. In other words, to compensate for distortions introduced in a double sideband signal (e.g., VSB and MSB), the pre-correction should be introduced in a double sideband signal. By following this principle, the preferred embodiment of the present invention achieves superior performance over the prior art.

Also, in the preferred IF embodiment of the present invention, as illustrted in FIG. 1, compensation of amplitude distortion introduced by SAW notch filter 17 is actually effected upon detection of the amplitude modulated television signal in TV receiver 18.

It should be noted that the method of the present invention of obtaining the inverse phase characteristic gives a significant technical advantage in implementation as compared with known methods. The advantage is that the inverse phase characteristic of a SAW notch filter, in the TV signal frequency band, directly corresponds to a filter of very high order, i.e., dozens of times higher than the order of a filter having a conventional phase characteristic of a SAW notch filter. With the application of a filter of the fourth or sixth order, the phase characteristic of a typical SAW notch filter can be approximated to a very high accuracy. It is easy to implement a filter like this in both the analog and digital form. However, approximating the inverse phase characteristic to the same accuracy, within the band of 6–8 MHz, using known methods, will require a filter order of about a hundred. Implementing such a filter is a matter of great difficulty, especially in the digital form. A similar advantage is obtained in the present invention with the implementation of amplitude pre-correction without appreciable phase distortions.

Figure 2A:
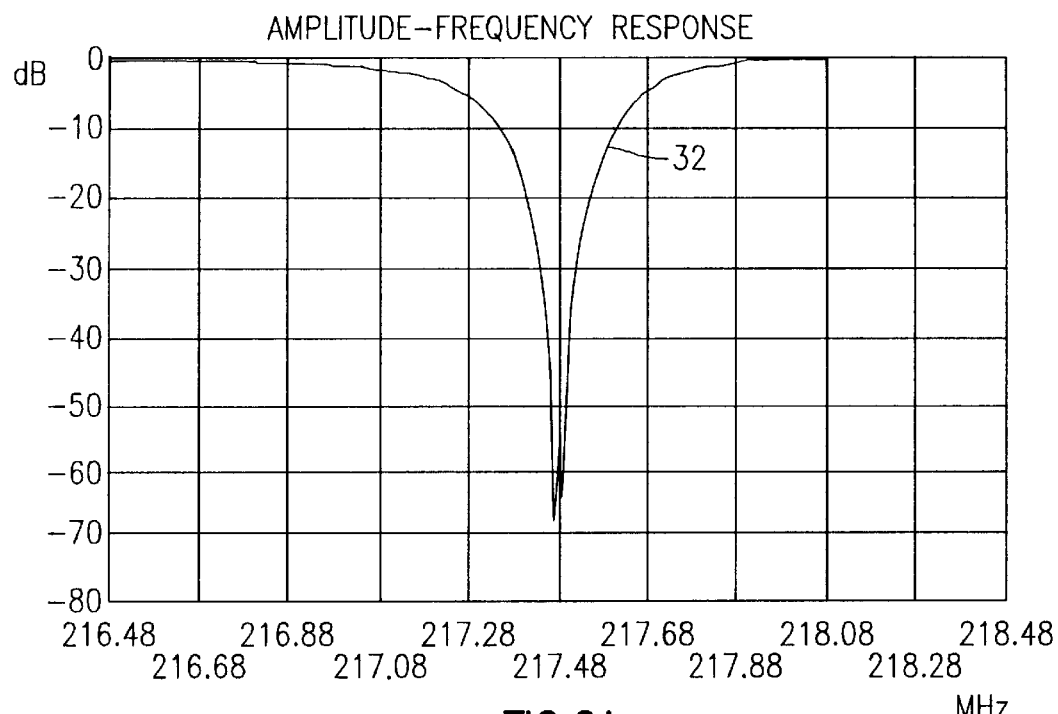
FIGS. 2A and 2B are amplitude-frequency and phase-frequency response curves, respectively, of a SAW notch filter used in the scrambling system of FIG. 1, for channel J (217.25 MHz), to remove a jamming carrier placed 230 kHz above the picture carrier in the MSB.
Figure 2B:
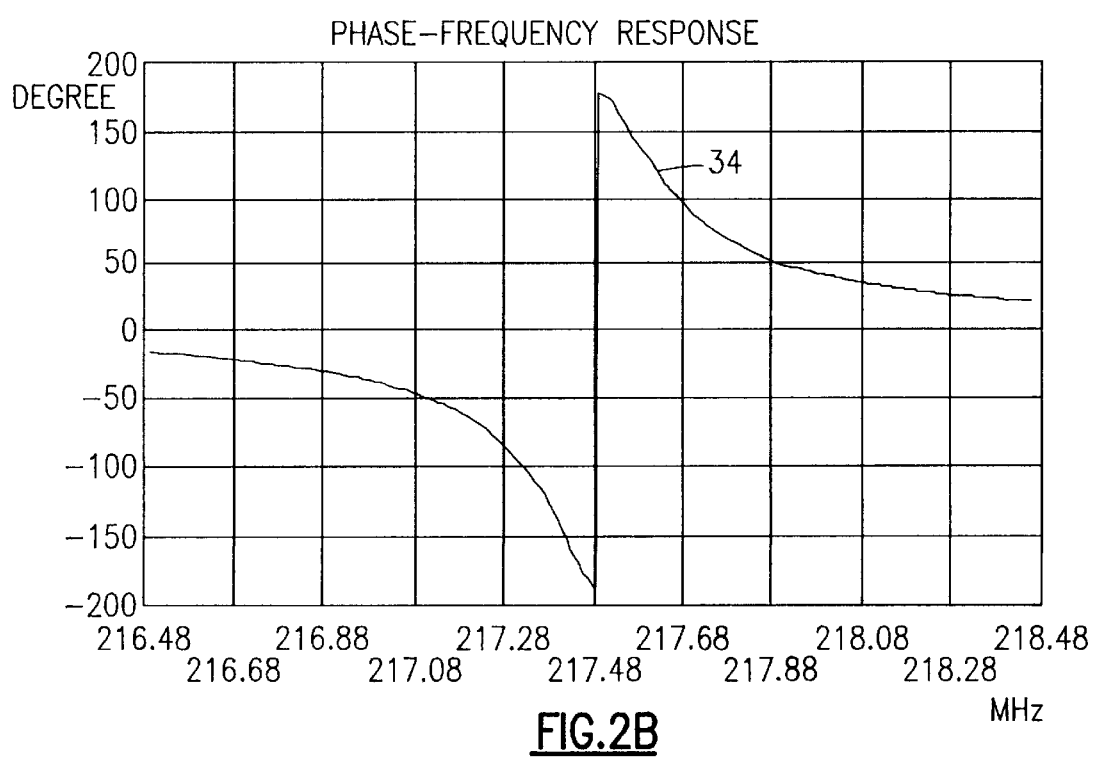

Referring now to FIGS. 2A and 2B, an amplitude-frequency response (or notch frequency response) curve 32 and a phase-frequency response curve 34 of SAW filter 17 are shown, respectively. The descrambling channel is J (217.25 MHz), and the jamming carrier is placed in the MSB of the TV signal, 230 kHz above the video carrier. The notch depth of filter 17 is greater than –55 dB, which is quite sufficient for removing the jamming carrier from the TV signal on the receive side.

Referring now to FIGS. 3A–3F, there is shown an amplitude spectrum 36(a–f) of the TV signal at different points in the scrambling system of FIG. 1. Application of pre-correction on the first IF in the system ensures pre-compensation of the TV signal close to the video carrier, including the VSB, which improves pre-correction quality and allows for different scrambling codes, such as placing a jamming carrier in either the MSB or VSB, or in both the MSB and VSB.

Figure 4A:
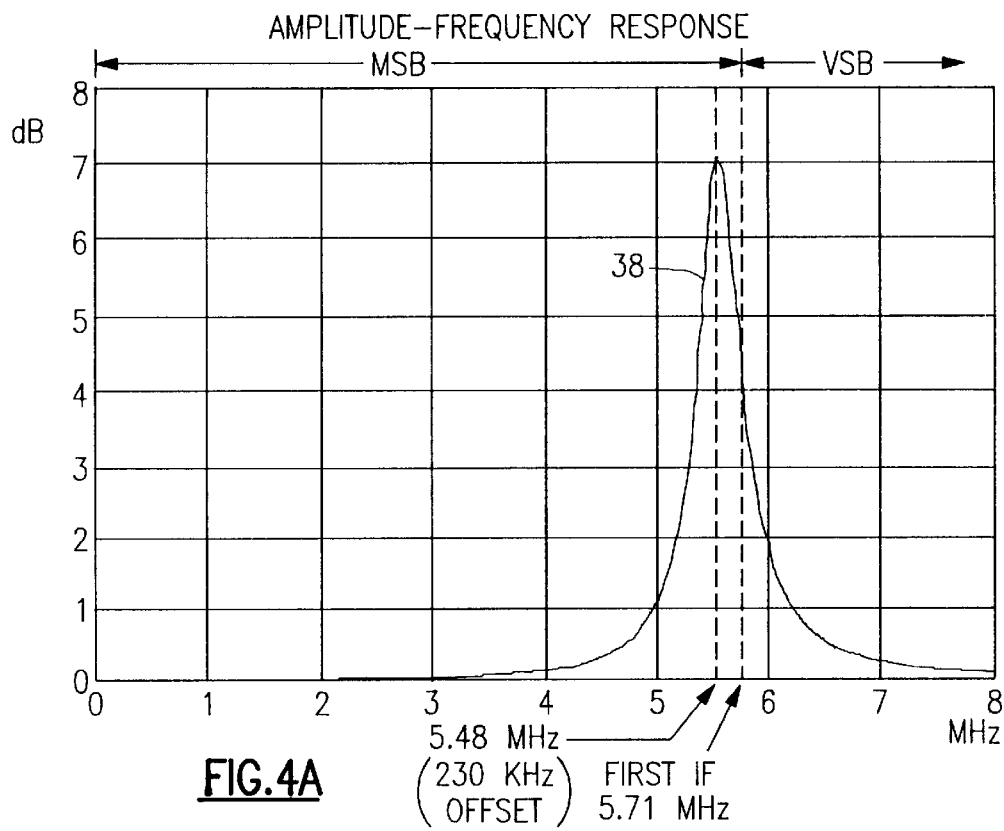
FIGS. 4A and 4B illustrate the amplitude-frequency and phase-frequency response curves, respectively, of the digital pre-corrector of the present invention, configured to compensate for a SAW notch filter having its notch tuned to 230 kHz below the picture carrier in the VSB.
Figure 4B:
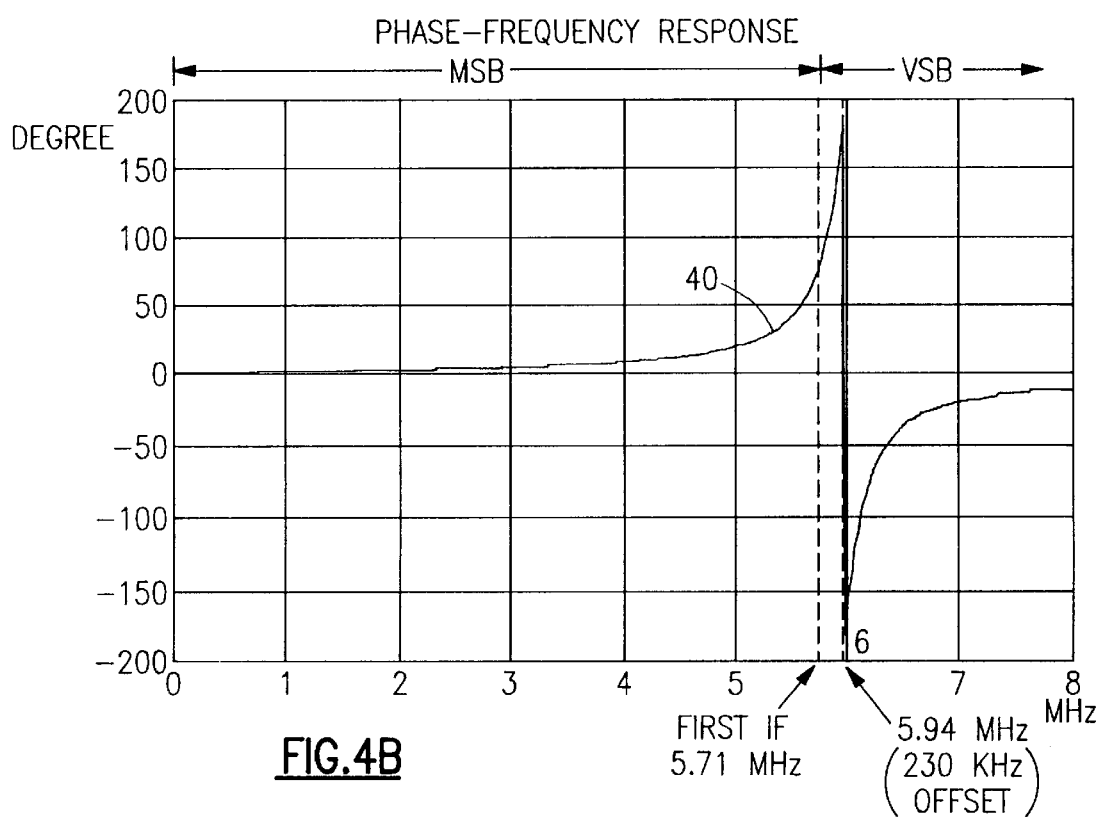

Referring now to FIGS. 4A and 4B, there is shown an amplitude-frequency response curve 38 and a phase-frequency response curve 40, respectively, of digital pre-corrector 2, at the first IF. Response curves 38 and 40 are configured to compensate for amplitude and phase distortions of a SAW notch filter having its notch tuned to 230 kHz below the picture carrier in the VSB. For this example, the SAW notch filter is employed to remove a jamming carrier tuned to 230 kHz below the picture carrier for channel J (217.25 MHz).

Figure 5A:
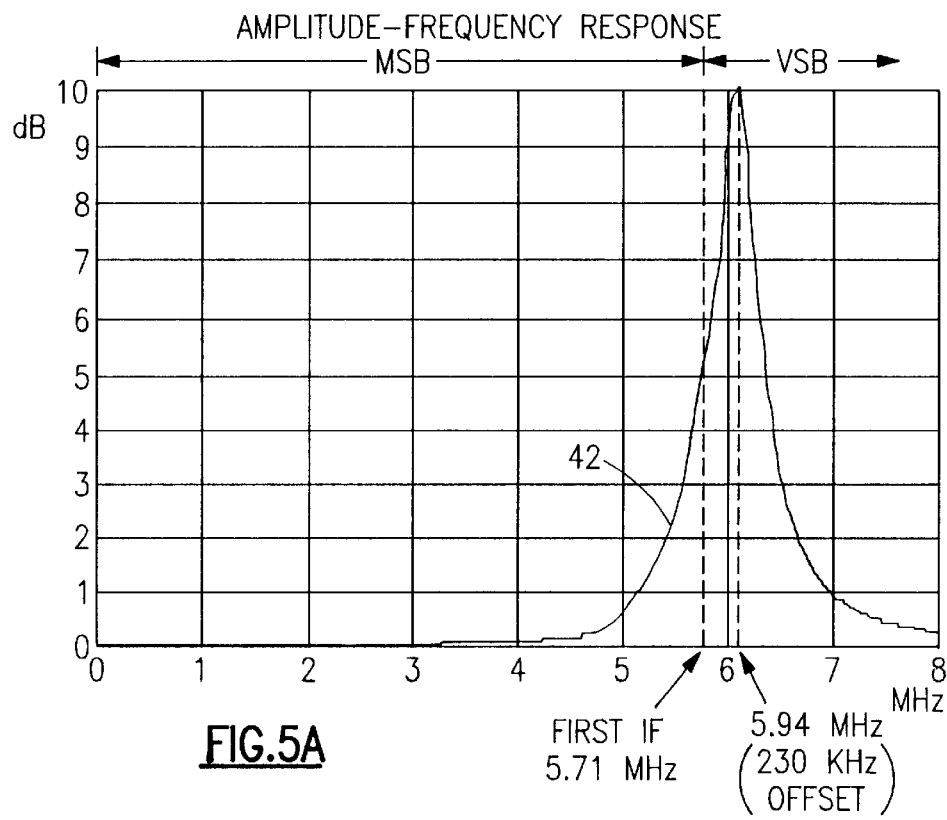
FIGS. 5A and 5B illustrate the amplitude-frequency and phase-frequency response curves, respectively, of the digital pre-corrector, configured to compensate for a SAW notch filter having its notch tuned to 230 kHz above the picture carrier in the MSB.
Figure 5B:
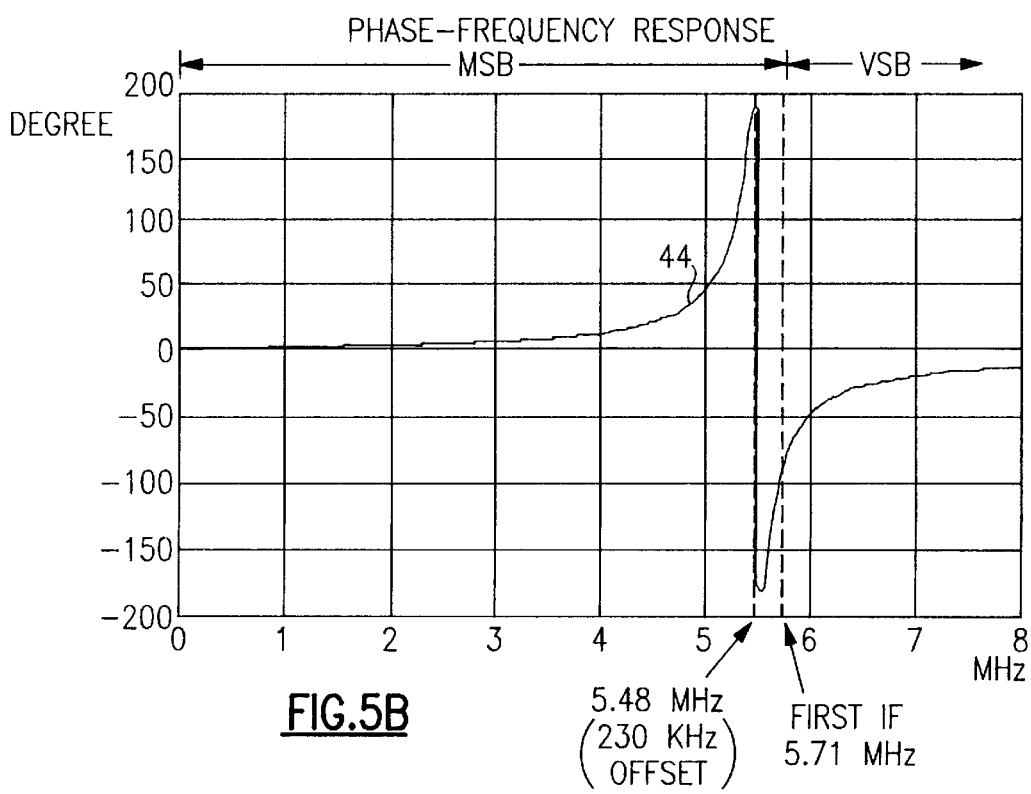

Referring now to FIGS. 5A and 5B, there is shown an amplitude-frequency response curve 42 and a phase-frequency response curve 44, respectively, of pre-corrector 2, at the first IF. Response curves 42 and 44 are configured to compensate for amplitude and phase distortions of a SAW notch filter having its notch tuned to 230 kHz above the picture carrier in the MSB. For this example, the SAW notch filter is employed to remove a jamming carrier tuned to 230 kHz above the picture carrier for channel J (217.25 MHz).

Phase responses 40 and 44 of pre-corrector 2 (FIGS. 4B and 5B, respectively) are inverse to phase response 34 of SAW notch filter 17 (FIG. 2B). Amplitude responses 38 and 42 of pre-corrector 2 (FIGS. 4A and 5A, respectively) are produced from narrowband pre-emphasis of the TV spectral components which are offset from the video carrier by the same amount as the spectral components suppressed by the SAW notch filter.

The TV signal processing in the TV receiver set, namely, the affect of the Nyquist slope of the IF bandpass filter, is allowed for, when determining the optimum pre-emphasis characteristic. Amplitude pre-distortions will become optimized when the amplitude characteristic of the "through path" (i.e., digital pre-corrector 2, TV modulator 23, SAW notch filter 17, and TV set 18) has substantially no in-band ripple. In any event, the ripple in the through path should not be more than the minimum accepted for most television systems (e.g., PAL, SECAM and NTSC)—not greater than +/−0.5 dB over 1 MHz. Such compensation method imposes restrictions on the band in which a jamming carrier can be placed. The band is limited to +/−200 to 400 kHz about the video carrier, because of the limited VSB bandwidth. It is not efficient to place a jamming carrier further down than −400 kHz, as it will be suppressed within the IF path of the TV receiver set. Thus, the system can provide two different codes, as a minimum, to one channel: a jamming carrier in the VSB and a jamming carrier in the MSB.

Figure 6A:
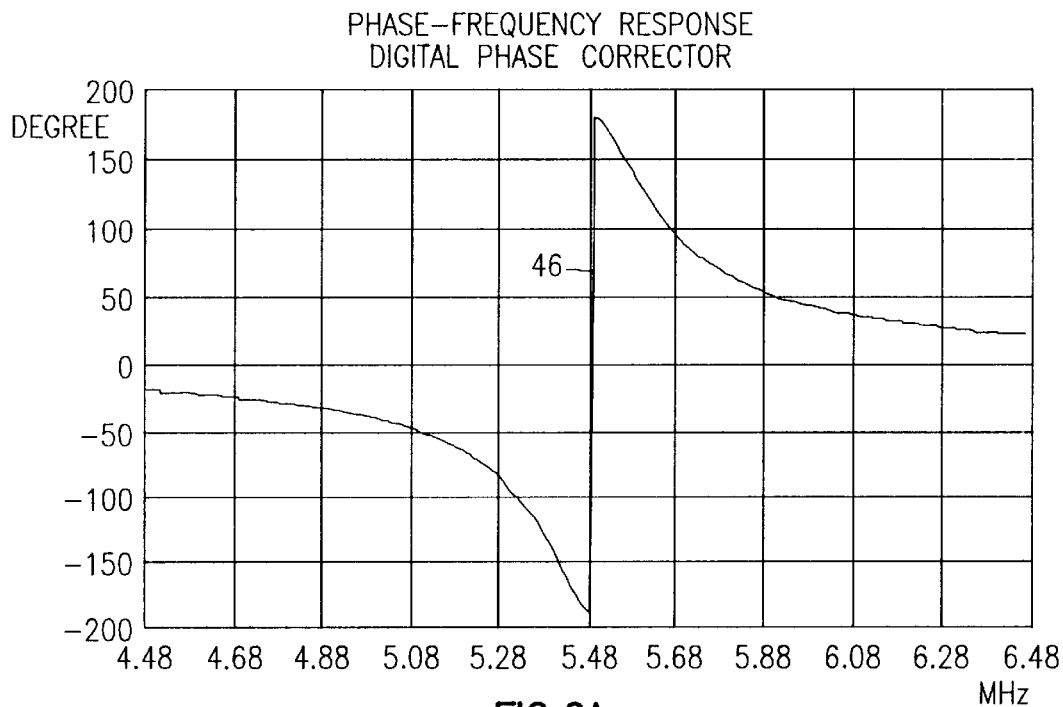
FIGS. 6A and 6B illustrate the phase-frequency response curves of a digital phase corrector of the present invention and the digital pre-corrector (after the second time inversion), respectively.
Figure 6B:
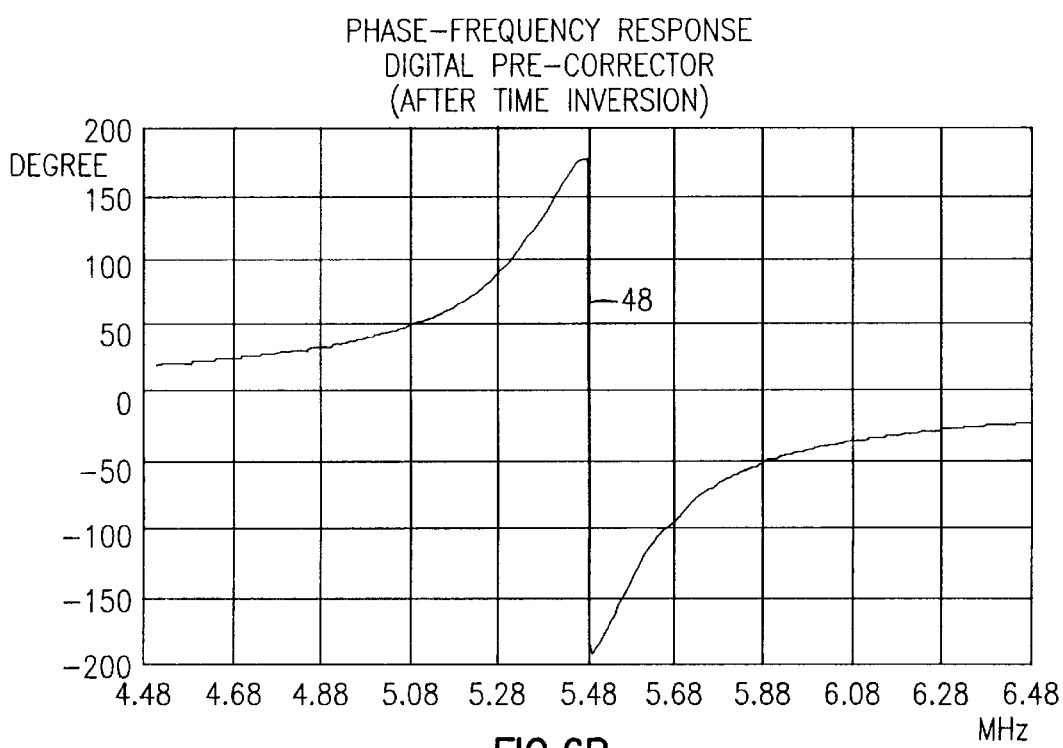

Referring now to FIGS. 6A and 6B, there is shown a phase-frequency response curve 46 of digital phase corrector 22 and a phase-frequency response curve 48 of digital pre-corrector 2 (after the second time inversion), respectively. Response curve 48 is the inverse of response curve 46.

Figure 7A:
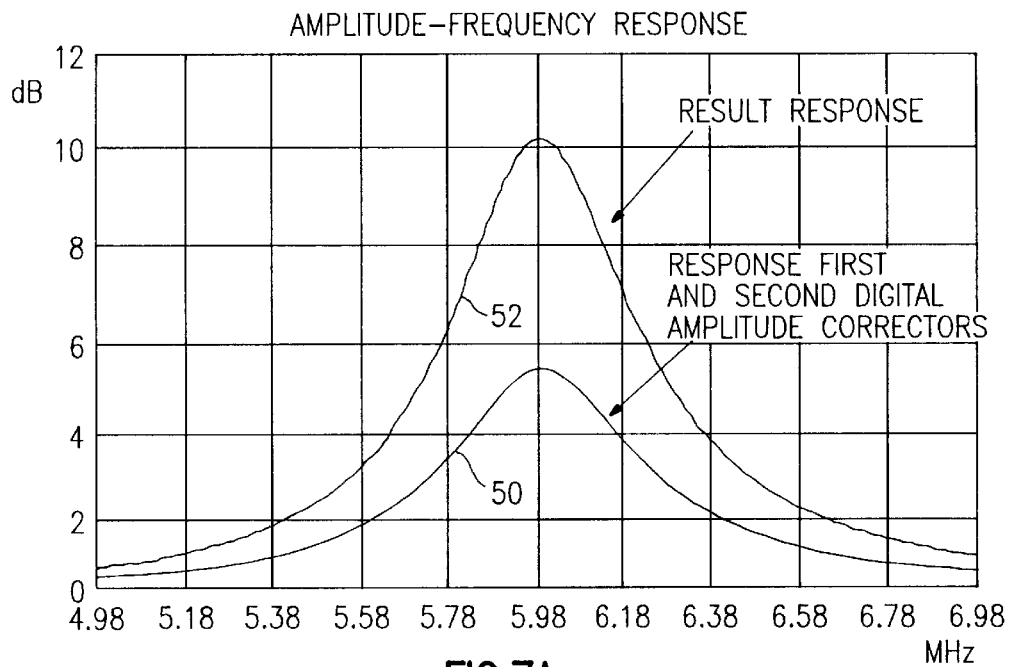
FIG. 7A illustrates amplitude-frequency response curves of a digital amplitude corrector and a digital pre-corrector (resultant response) of the present invention.
Figure 7B:
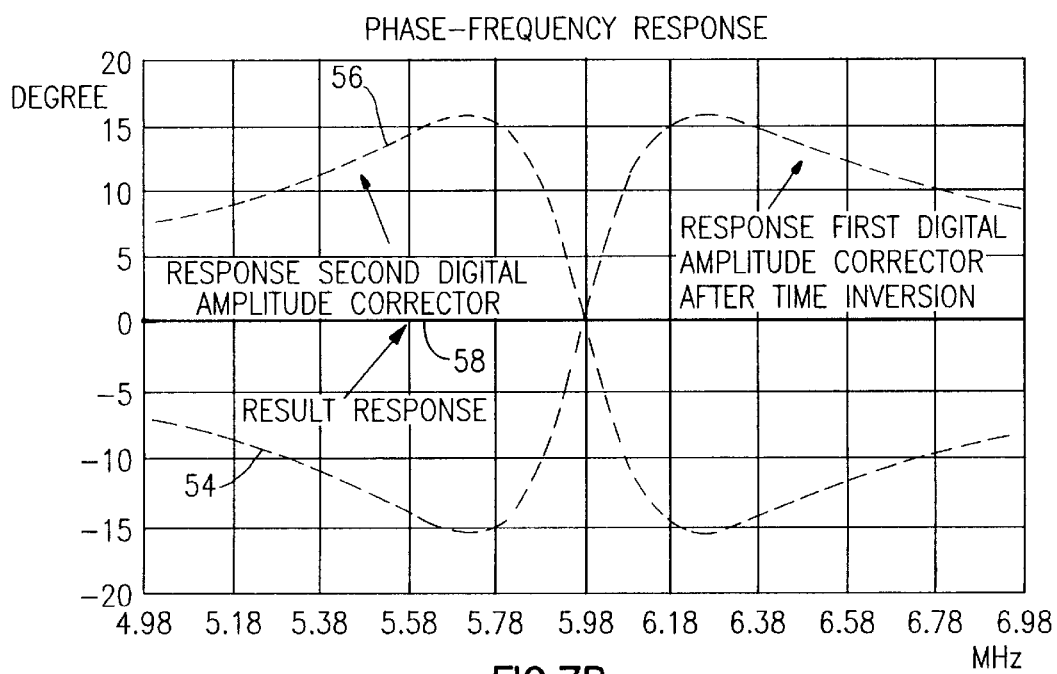
FIG. 7B illustrates a phase-frequency response curve of an amplitude corrector after time inversion, a phase-frequency response curve of a second amplitude corrector, and a phase-frequency response curve which is the resultant of the two aforementioned phase-frequency response curves.

Referring now to FIG. 7A, there is shown an amplitude-frequency response curve 50 of amplitude corrector 21 or 12 ($\sqrt{A(w)}$), and an amplitude-frequency response curve 52 of digital pre-corrector 2 (resultant response−A(w)). FIG. 7B shows a phase-frequency response curve 54 of amplitude corrector 21 after time inversion by RAM FILO units 10, 11 and controller 6. FIG. 7B also shows a phase-frequency response curve 56 of amplitude corrector 12, and a resultant phase response curve 58. Response curve 58 is the resultant of phase response 54 and phase response 56. Note that resultant response 58 is linear and flat, and is obtained by using two amplitude correctors and time inversion.

Figure 8:
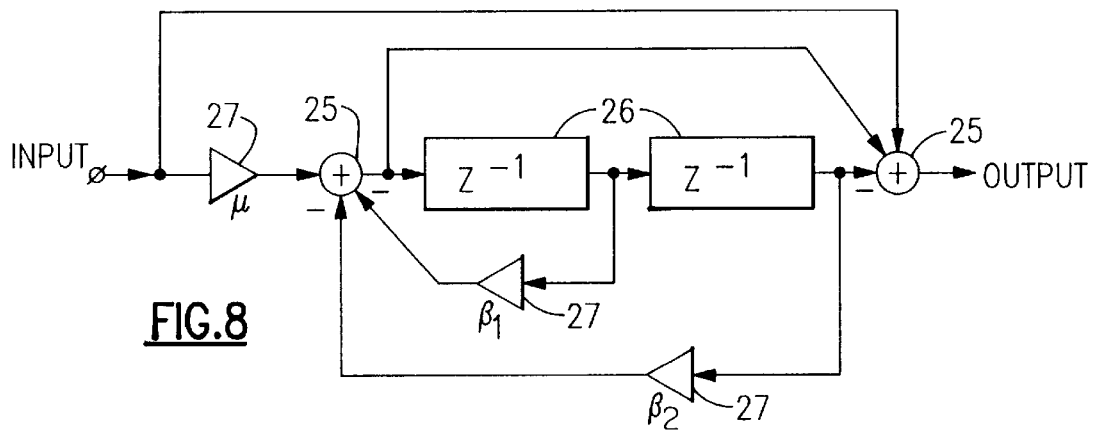
FIG. 8 is a block diagram of a second order digital amplitude corrector of the present invention.
Figure 9:
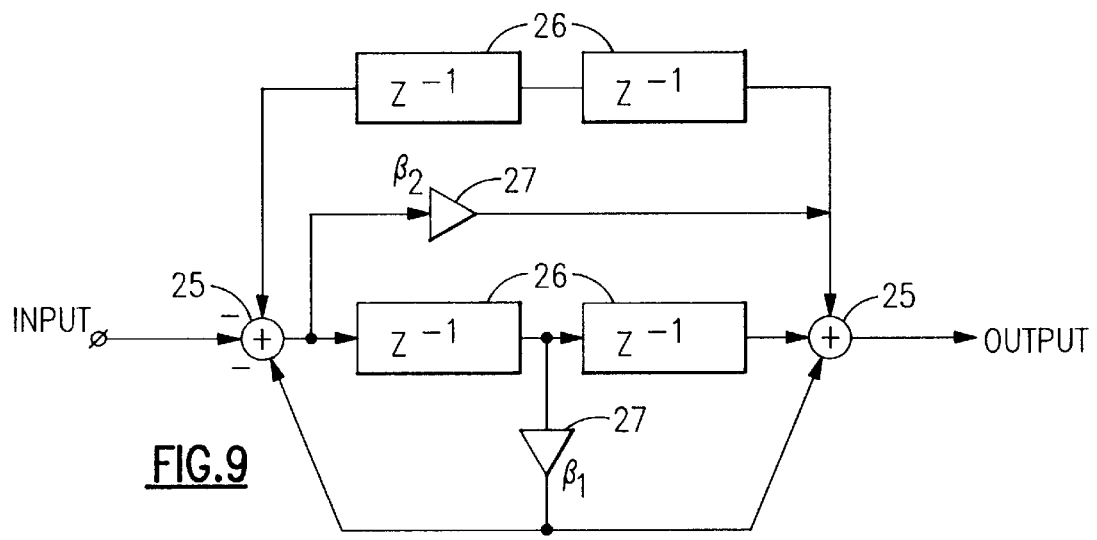
FIG. 9 is a block diagram of a second order digital phase corrector of the present invention.

Referring now to FIGS. 8 and 9, there is shown block diagrams for the classical second order circuits used in digital amplitude correctors 21,12 and digital phase corrector 22, respectively. These circuits include multipliers 27, summers 25, and clock rate period delay circuits 26. These circuits are derived from z-transformations of transfer functions of corresponding analog corrector circuits. The structure and operation of these circuits are well known to those in the digital filter art, and thus, a further detailed description of same is not necessary. Digital amplitude correctors 21,12 may be implemented simply by the circuit shown in FIG. 8 or by cascading two of them together (i.e., second or fourth order correctors). Digital phase corrector 22 may be implemented by cascading two or three stages of the circuit shown in FIG. 9 (i.e., fourth or sixth order corrector).

Figure 10:
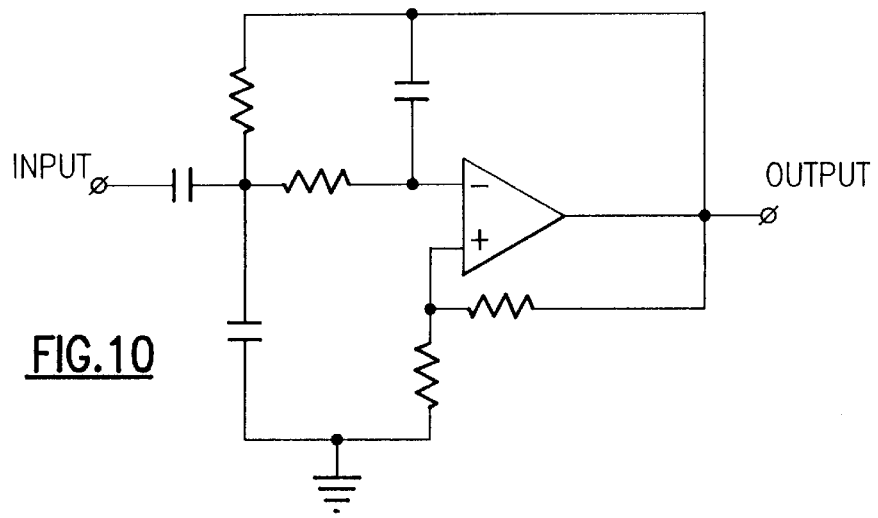
FIG. 10 is a block diagram of a second order analog amplitude corrector of the present invention.

In an alternative embodiment to the one shown in FIG. 1, the second amplitude corrector (amplitude corrector 12) could be implemented as an analog amplitude corrector. In this case, amplitude corrector 12 would be coupled to the output of D/A converter 13. An example of a second order analog filter for amplitude corrector 12 is shown in FIG. 10. The circuit of FIG. 10 is well known in the art and thus will not be described in further detail herein. Analog amplitude and phase correctors may also be implemented solely from passive RLC components (e.g., a passive pre-emphasis filter).

In another alternative embodiment, digital amplitude corrector 12 may be located at the input rather than the output of controller 6. In such an embodiment, corrector 12 is coupled between the output of modulator 5 and the input of controller 6.

Figure 11C:
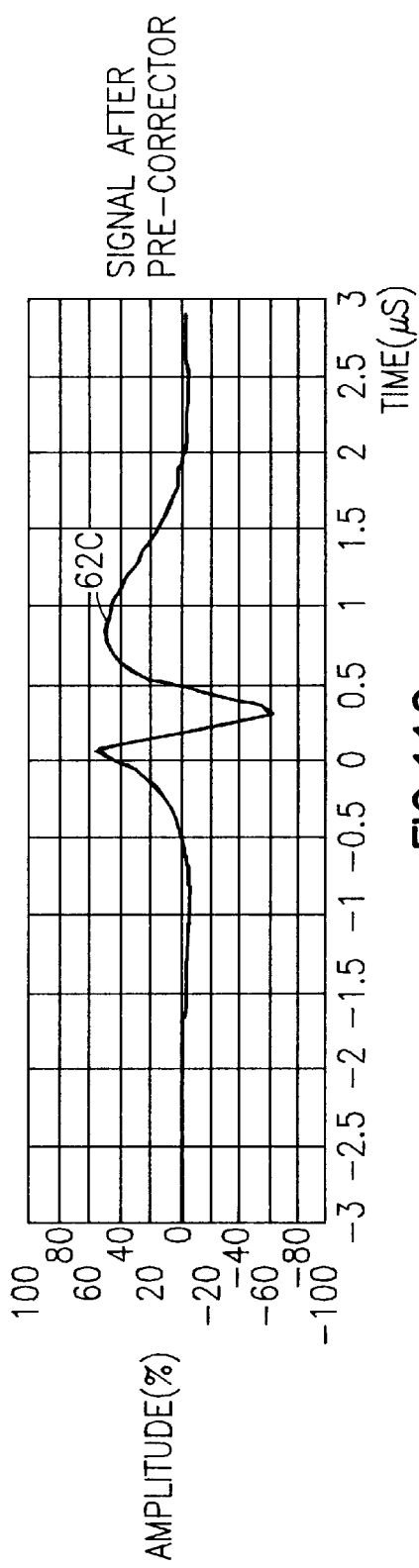
Figure 11D:
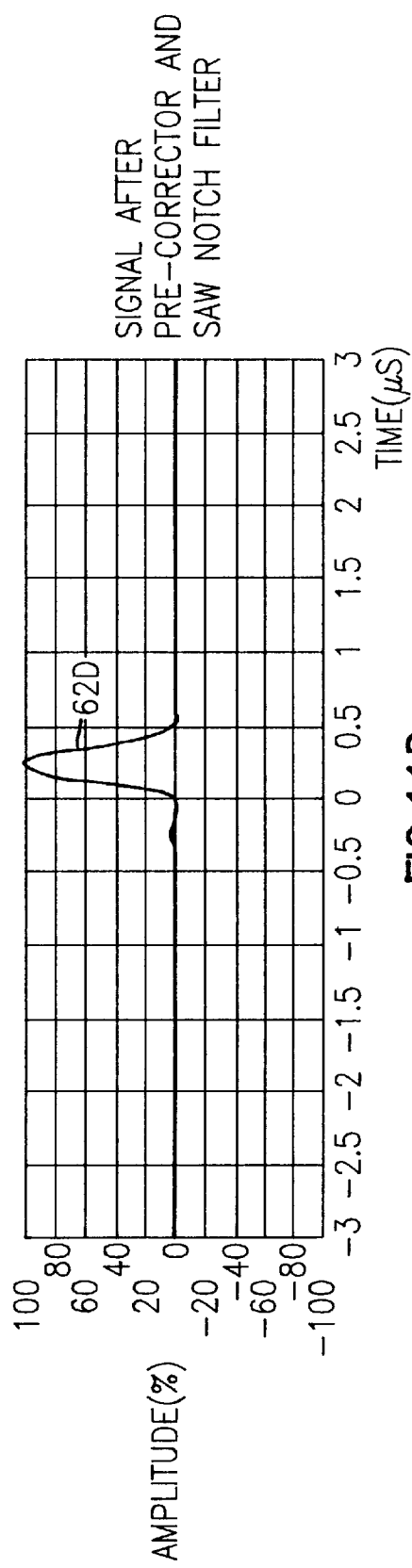

In FIGS. 11A–11D, there is shown a series of waveform plots 62a–62d of a sine-squared video pulse before and after distortion by SAW notch filter 17, without pre-correction (FIGS. 11A–11B) and with pre-correction by pre-corrector 2 (FIGS. 11C–11D). In this example, the channel is channel J (217.25 MHz), and SAW notch filter 17 is tuned to remove a jamming carrier in the MSB, 230 kHz above the picture carrier.

Figure 12C:
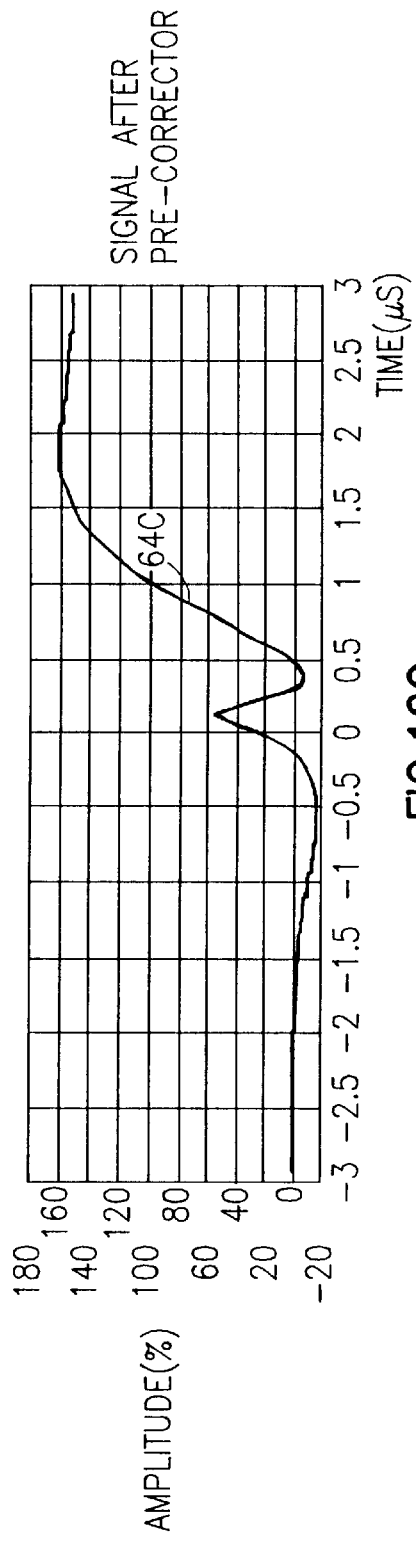
Figure 12D:
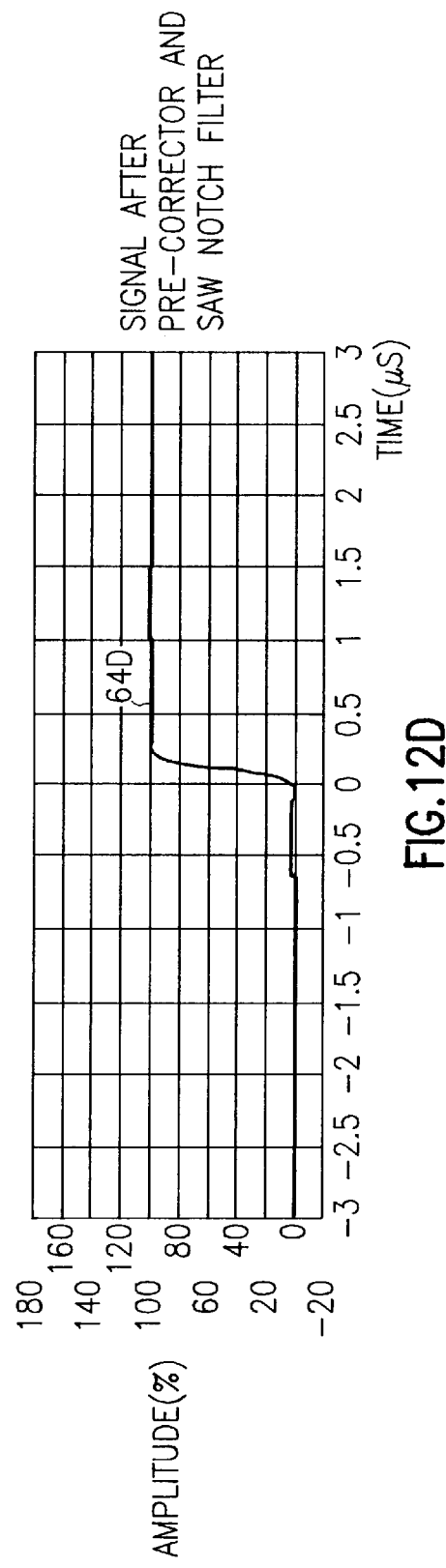

In FIGS. 12A–12D, there is shown a series of waveform plots 64a–64d of a step video pulse before and after distortion by SAW notch filter 17, without pre-correction (FIGS. 12A–12B) and with pre-correction by pre-corrector 2 (FIGS. 12C–12D). In this example, the channel is channel J (217.25 MHz), and SAW notch filter 17 is tuned to remove a jamming carrier in the MSB, 230 kHz above the picture carrier.

As demonstrated by the plots in FIGS. 11A–11B and 12A–12B, the maximum ringing amplitude without pre-correction is up to about 80%. By contrast, in the case of pre-correction (FIGS. 11C–11D and 12C–12D), the ringing amplitude does not exceed 1–2%, which meets the strict requirements for TV signal quality.

Figure 13:
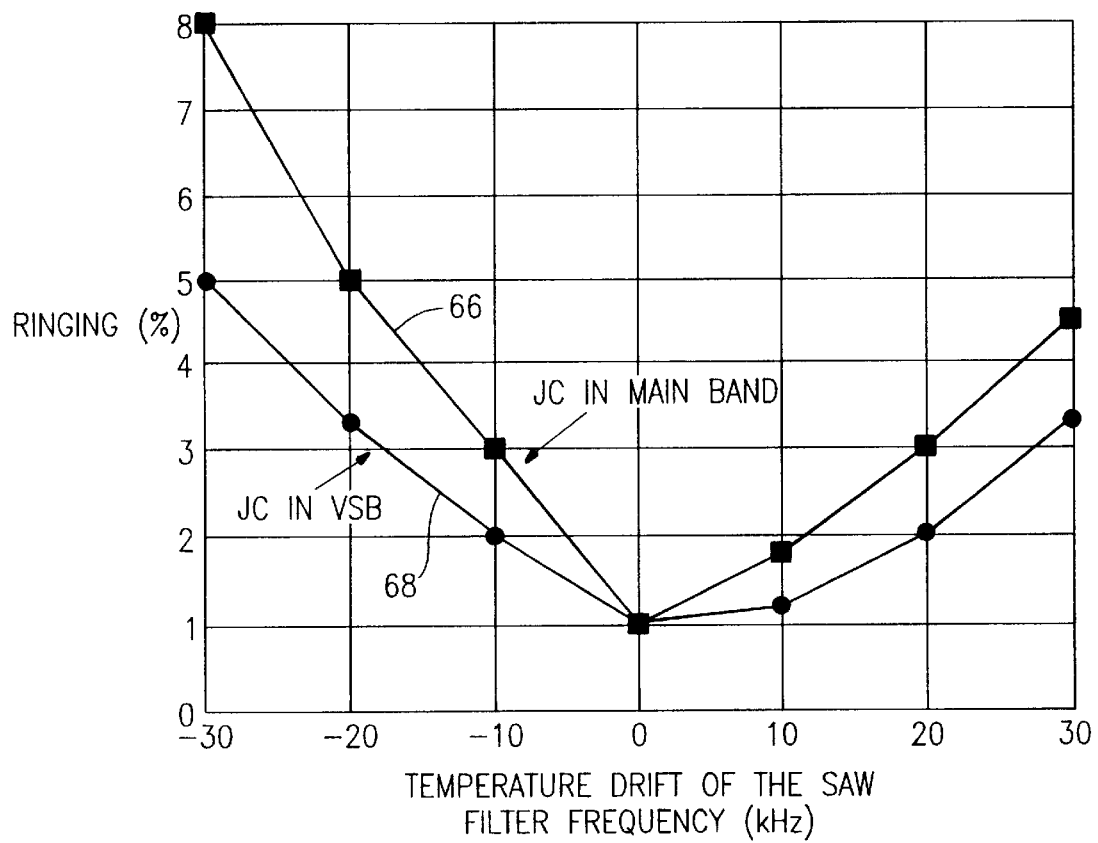
FIG. 13 is a graph showing plots of the degree of spurious oscillations (i.e., ringing) of the video signal, after the pre-corrector and SAW notch filter, versus temperature drift of the SAW notch filter frequency, for the cases of placing a jamming carrier in the VSB (−230 kHz offset) and in the MSB (+230 kHz offset) of the TV signal.

Referring now to FIG. 13, there is shown a graph containing a pair of plots 66 and 68, which show the degree of spurious oscillations (i.e., % of ringing) during the video signal transient process (after the signal has passed through pre-corrector 2 and SAW notch filter 17) versus temperature drift of the SAW notch filter frequency. Plot 66 is the case where a jamming carrier is placed in the MSB (230 kHz above the picture carrier), and plot 68 is the case where a jamming carrier is placed in the VSB (230 kHz below the picture carrier). Plots 66 and 68 are for channel J (217.25 MHz). At 217.25 MHz, and within the temperature range −40° C. to +60° C., the maximum frequency drift of a quartz SAW notch filter is about +/−15 kHz. From plots 66 and 68, it is determined that this drift results in a distortion increase of from about 1% to 3–4%, which meets the requirements for quality of a descrambled signal.

While the preferred embodiment of the invention has been particularly described in the specification and illustrated in the drawing, it should be understood that the invention is not so limited. Many modifications, equivalents, and adaptations of the invention will become apparent to those skilled in the art without departing from the spirit and scope of the invention as defined in the appended claims.

What is claimed is:

1. An apparatus for processing a television signal in a television scrambling system of the type in which a scrambling signal is substantially removed by a notch filter having a phase response and a notch frequency response, said apparatus comprising:

signal inverting means for inverting the television signal as a function of time;

phase corrector means for pre-distorting the phase of the time-inverted television signal in accordance with the phase response of the notch filter; and signal restoring means for restoring the television signal to a time uninverted state following pre-distortion in the phase corrector means, such that the phase of the restored television signal is pre-distorted in accordance with the inverse of the phase response of the notch filter, whereby said phase pre-distortion is produced without the difficulty normally associated with direct phase pre-correction, and whereby phase distortion introduced by the notch filter is substantially compensated by said phase pre-distortion in the restored television signal.

2. The apparatus as recited in claim 1, further comprising an amplitude corrector which pre-emphasizes the television signal in a frequency band determined by the notch frequency response, whereby amplitude distortion introduced by the notch filter is substantially compensated by the pre-emphasis of the television signal.

3. The apparatus as recited in claim 1, further comprising a first amplitude corrector, coupled between said signal inverting means and said signal restoring means, for pre-emphasizing the time-inverted television signal in a frequency band determined by the notch frequency response, said first amplitude corrector having a phase response; and a second amplitude corrector, coupled to said signal restoring means, for pre-emphasizing the restored television signal in said frequency band, said second amplitude corrector having a phase response which is substantially equivalent to the phase response of said first amplitude corrector, whereby phase distortion introduced in the time-inverted television signal by said first amplitude corrector is substantially compensated by phase distortion introduced in the restored television signal by said second amplitude corrector, and whereby amplitude distortion introduced by the notch filter is substantially compensated by the pre-emphasis of the television signal by said first and said second amplitude correctors.

4. The apparatus as recited in claim 1, further comprising a first amplitude corrector for pre-emphasizing the television signal before inversion by said signal inverting means, in a frequency band determined by the notch frequency response, said first amplitude corrector having a phase response; and a second amplitude corrector, coupled between said signal inverting means and said signal restoring means, for pre-emphasizing the time-inverted television signal in said frequency band, said second amplitude corrector having a phase response which is substantially equivalent to the phase response of said first amplitude corrector, whereby phase distortion introduced in the television signal by said first amplitude corrector is substantially compensated by phase distortion introduced in the time-inverted television signal by said second amplitude corrector, and whereby amplitude distortion introduced by the notch filter is substantially compensated by the pre-emphasis of the television signal by said first and said second amplitude correctors.

5. The apparatus as recited in claim 1, further comprising first converter means for converting the television signal to digital form before inversion by said inverting means, said inverting means, said phase corrector means, and said restoring means being digital processing elements which operate on the digital form of the television signal; and second converter means for converting the restored television signal from said restoring means from digital form to analog form.

6. The apparatus as recited in claim 5, further comprising a first digital amplitude corrector, coupled between said signal inverting means and said signal restoring means, for pre-emphasizing the time-inverted television signal in a frequency band determined by the notch frequency response, said first amplitude corrector having a phase response; and a second digital amplitude corrector, coupled between said signal restoring means and said second converter means, for pre-emphasizing the restored television signal in said frequency band, said second amplitude corrector having a phase response which is substantially equivalent to the phase response of said first amplitude corrector, whereby phase distortion introduced in the time-inverted television signal by said first amplitude corrector is substantially compensated by phase distortion introduced in the restored television signal by said second amplitude corrector, and whereby amplitude distortion introduced by the notch filter is substantially compensated by the pre-emphasis of the television signal by said first and second amplitude correctors.

7. The apparatus as recited in claim 5, further comprising a digital amplitude corrector, coupled between said signal inverting means and said signal restoring means, for pre-emphasizing the time-inverted television signal in a frequency band determined by the notch frequency response, said digital amplitude corrector having a phase response; and an analog amplitude corrector, coupled to the output of said second converter means, for pre-emphasizing the restored analog television signal in said frequency band, said analog amplitude corrector having a phase response which is substantially equivalent to the phase response of said digital amplitude corrector, whereby phase distortion introduced in the time-inverted television signal by said digital amplitude corrector is substantially compensated by phase distortion introduced in the restored television signal by said analog amplitude corrector, and whereby amplitude distortion introduced by the notch filter is substantially compensated by the pre-emphasis of the television signal by said digital and said analog amplitude correctors.

8. The apparatus as recited in claim 1, wherein the television signal is a TV video signal.

9. The apparatus as recited in claim 1, wherein the television signal is an IF television signal having an IF picture carrier amplitude modulated by a TV video signal.

10. A television scrambling system of the type in which the descrambler is a SAW notch filter having a phase response and a notch frequency response, said system comprising:

first converter means for converting an analog TV video signal to a digital TV video signal;

a digital modulator, coupled to said first converter means, for generating a digital IF TV signal having an IF picture carrier which is amplitude modulated by the digital TV video signal;

signal inverting means, coupled to said digital modulator, for inverting the digital IF signal as a function of time;

phase corrector means, coupled to said signal inverting means, for pre-distorting the phase of the time-inverted digital IF signal in accordance with the phase response of the SAW notch filter;

signal restoring means for restoring the digital IF signal to a time uninverted state following pre-distortion in the phase corrector means, such that the phase of the restored digital IF signal is pre-distorted in accordance with the inverse of the phase response of the SAW notch filter, whereby said phase pre-distortion is produced without the difficulty normally associated with direct phase pre-correction; and second converter means, coupled to said restoring means, for converting the restored digital IF signal to analog form, whereby phase distortion introduced by the SAW notch filter is substantially compensated by the phase pre-distortion in the restored IF signal.

11. The system as recited in claim 10, further comprising a first digital amplitude corrector, coupled between said signal inverting means and said signal restoring means, for pre-emphasizing the time-inverted digital IF signal in a frequency band determined by the SAW notch frequency response, said first amplitude corrector having a phase response; and a second digital amplitude corrector, coupled between said signal restoring means and said second converter means, for pre-emphasizing the restored digital IF signal in said frequency band, said second amplitude corrector having a phase response which is substantially equivalent to the phase response of said first amplitude corrector, whereby phase distortion introduced in the time-inverted IF signal by said first amplitude corrector is substantially compensated by phase distortion introduced in the restored IF signal by said second amplitude corrector, and whereby amplitude distortion introduced by the SAW notch filter is substantially compensated by the pre-emphasis of the IF signal by said first and said second amplitude correctors.

12. The system as recited in claim 10, further comprising a first digital amplitude corrector, coupled between said digital modulator and said signal inverting means, for pre-emphasizing the digital IF signal in a frequency band determined by the SAW notch frequency response, said first amplitude corrector having a phase response; and a second digital amplitude corrector, coupled between said signal inverting means and said signal restoring means, for pre-emphasizing the time-inverted digital IF signal in said frequency band, said second amplitude corrector having a phase response which is substantially equivalent to the phase response of said first amplitude corrector, whereby phase distortion introduced in the IF signal by said first amplitude corrector is substantially compensated by phase distortion introduced in the time-inverted IF signal by said second amplitude corrector, and whereby amplitude distortion introduced by the SAW notch filter is substantially compensated by the pre-emphasis of the IF signal by said first and said second amplitude correctors.

13. The system as recited in claim 10, further comprising a digital amplitude corrector, coupled between said signal inverting means and said signal restoring means, for pre-emphasizing the time-inverted digital IF signal in a frequency band determined by the notch frequency response, said digital amplitude corrector having a phase response; and an analog amplitude corrector, coupled to the output of said second converter means, for pre-emphasizing the restored analog IF signal in said frequency band, said analog amplitude corrector having a phase response which is substantially equivalent to the phase response of said digital amplitude corrector, whereby phase distortion introduced in the time-inverted IF signal by said digital amplitude corrector is substantially compensated by phase distortion introduced in the restored IF signal by said analog amplitude corrector, and whereby amplitude distortion introduced by the SAW notch filter is substantially compensated by the pre-emphasis of the IF signal by said digital and said analog amplitude correctors.

14. The system as recited in claim 10, further comprising an up-converter, coupled to the output of said second converter means, for converting the restored analog IF signal to a second IF TV signal.

15. The system as recited in claim 10, further comprising an up-converter, coupled to the output of said second converter means, for converting the restored analog IF signal to a second IF TV signal; and encoding means, coupled to the output of said up-converter, for inserting a scrambling signal into the second IF TV signal at a frequency determined by the notch frequency response of the SAW notch filter.

16. The system as recited in claim 10, further comprising an up-converter, coupled to the output of said second converter means, for converting the restored analog IF signal to a second IF TV signal;

encoding means, coupled to the output of said up-converter, for inserting a scrambling signal into the second IF TV signal, at a frequency determined by the notch frequency response of the SAW notch filter, to create a scrambled IF signal; and a television modulator for receiving the scrambled IF signal and converting it to a scrambled RF television signal.

17. The system as recited in claim 10, further comprising an up-converter, coupled to the output of said second converter means, for converting the restored analog IF signal to a second IF TV signal;

encoding means, coupled to the output of said up-converter, for inserting a scrambling signal into the second IF TV signal, at a frequency determined by the notch frequency response of the SAW notch filter, to create a scrambled IF signal;

a television modulator for receiving the scrambled IF signal and converting it to a scrambled RF television signal; and the SAW notch filter, coupled to said television modulator, for receiving the scrambled RF television signal and substantially removing the scrambling signal therefrom, the notch frequency response of said SAW notch filter being substantially tuned to the scrambling signal.

18. The system as recited in claim 10, wherein the TV video signal includes a series of vertical sync pulses, and the digital IF TV signal includes a series of digital TV signal fields; and wherein said signal inverting means includes first FILO memory means to and from which the signal fields of said IF signal are read, whereby inversion of the signal fields is effected when the fields are read from said first FILO memory means; and wherein said signal restoring means includes second FILO memory means to and from which the inverted signal fields are read, whereby restoration of the signal fields to an uninverted state is effected when the fields are read from said second FILO memory means.

19. The system as recited in claim 11, further comprising an up-converter, coupled to the output of said second converter means, for converting the restored analog IF signal to a second IF TV signal; and encoding means, coupled to the output of said up-converter, for inserting a scrambling signal into the second IF TV signal, at a frequency determined by the notch frequency response of the SAW notch filter, to create a scrambled IF signal.

20. The system as recited in claim 11, further comprising
an up-converter, coupled to the output of said second converter means, for converting the restored analog IF signal to a second IF TV signal;
encoding means, coupled to the output of said up-converter, for inserting a scrambling signal into the second IF TV signal, at a frequency determined by the notch frequency response of the SAW notch filter, to create a scrambled IF signal;
a television modulator for receiving the scrambled IF signal and converting it to a scrambled RF television signal; and
the SAW notch filter, coupled to said television modulator, for receiving the scrambled RF television signal and substantially removing the scrambling signal therefrom, the notch frequency response of said SAW notch filter being substantially tuned to the scrambling signal.

21. The system as recited in claim 18, further comprising
control means, coupled to said first and said second FILO memory means, for controlling the read operations to and from said first and said second FILO memory means, in accordance with the vertical sync pulses of the TV video signal.

22. A television scrambling method which utilizes a SAW notch filter having a phase response and a notch frequency response, said method comprising the steps of:

(a) converting an analog TV video signal to a digital TV video signal;

(b) generating a digital IF TV signal from the digital TV video signal;

(c) inverting the digital IF signal as a function of time;

(d) pre-distorting the phase of the time-inverted digital IF signal in accordance with the phase response of the SAW notch filter;

(e) restoring the digital IF signal to a time uninverted state following step (d), such that the phase of the restored digital IF signal is pre-distorted in accordance with the inverse of the phase response of the SAW notch filter, whereby said phase pre-distortion is produced without the difficulty normally associated with direct phase pre-correction; and (f) converting the restored digital IF signal to analog form, whereby phase distortion introduced by the SAW notch filter is substantially compensated by the phase pre-distortion in the restored IF signal.

23. The method as recited in claim 22, further comprising the steps of (g) pre-emphasizing the time-inverted digital IF signal in a frequency band determined by the SAW notch frequency response, using a first digital amplitude corrector having a phase response; and (h) pre-emphasizing the restored digital IF signal in said frequency band, using a second digital amplitude corrector having a phase response which is substantially equivalent to the phase response of said first amplitude corrector, whereby phase distortion introduced in the time-inverted IF signal by said first amplitude corrector is substantially compensated by phase distortion introduced in the restored IF signal by said second amplitude corrector, and whereby amplitude distortion introduced by the SAW notch filter is substantially compensated by the pre-emphasis of the IF signal by said first and said second amplitude correctors.

24. The method of claim 22, further comprising the steps of (g) pre-emphasizing, before step (c), the digital IF signal in a frequency band determined by the SAW notch frequency response, using a first digital amplitude corrector having a phase response; and (h) pre-emphasizing the time-inverted digital IF signal in said frequency band, using a second digital amplitude corrector having a phase response which is substantially equivalent to the phase response of said first amplitude corrector, whereby phase distortion introduced in the IF signal by said first amplitude corrector is substantially compensated by phase distortion introduced in the time-inverted IF signal by said second amplitude corrector, and whereby amplitude distortion introduced by the SAW notch filter is substantially compensated by the pre-emphasis of the IF signal by said first and said second amplitude correctors.

25. The method of claim 22, further comprising the steps of (g) pre-emphasizing the time-inverted digital IF signal in a frequency band determined by the SAW notch frequency response, using a digital amplitude corrector having a phase response; and (h) pre-emphasizing, after step (f), the restored IF signal in said frequency band, using an analog amplitude corrector having a phase response which is substantially equivalent to the phase response of said digital amplitude corrector, whereby phase distortion introduced in the time-inverted IF signal by said digital amplitude corrector is substantially compensated by phase distortion introduced in the restored IF signal by said analog amplitude corrector, and whereby amplitude distortion introduced by the SAW notch filter is substantially compensated by the pre-emphasis of the IF signal by said digital and said analog amplitude correctors.

26. An apparatus for distorting an electrical signal with an inverted phase response, comprising:

signal inverting means for inverting the electrical signal as a function of time;

phase corrector means for pre-distorting the phase of the time-inverted electrical signal in accordance with the phase response; and signal restoring means for restoring the electrical signal to a time uninverted state following pre-distortion in the phase corrector means, such that the phase of the restored electrical signal is pre-distorted in accordance with the inverse of the phase response, whereby said phase pre-distortion is produced without the difficulty normally associated with direct phase pre-correction.

27. A method of distorting an electrical signal with an inverted phase response, comprising the steps of:

inverting the electrical signal as a function of time;

pre-distorting the phase of the time-inverted electrical signal in accordance with the phase response; and restoring the electrical signal to a time uninverted state, whereby the phase of the restored electrical signal is pre-distorted in accordance with the inverse of the phase response, and whereby said phase pre-distortion is produced without the difficulty normally associated with direct phase pre-correction.

28. An apparatus for pre-emphasizing an electrical signal in a desired frequency band, without introducing appreciable phase distortion, said apparatus comprising:

signal inverting means for inverting the electrical signal as a function of time;

a first amplitude corrector, coupled to the output of said signal inverting means, for pre-amplifying the time-inverted electrical signal in the desired frequency band, said first amplitude corrector having a phase response;

signal restoring means, coupled to the output of said first amplitude corrector, for restoring the electrical signal to a time uninverted state, such that the phase of the restored electrical signal is pre-distorted in accordance with the inverse of the phase response of said first amplitude corrector, whereby said phase pre-distortion is produced without the difficulty normally associated with direct phase pre-correction; and a second amplitude corrector, coupled to the output of said signal restoring means, for pre-amplifying the restored electrical signal in the desired frequency band, said second amplitude corrector having a phase response which is substantially equivalent to the phase response of said first amplitude corrector, whereby phase distortion introduced in the time-inverted electrical signal by said first amplitude corrector is substantially compensated by phase distortion introduced in the restored electrical signal by said second amplitude corrector.

29. An apparatus for pre-emphasizing an electrical signal in a desired frequency band, without introducing appreciable phase distortion, said apparatus comprising:

a first amplitude corrector for pre-amplifying the electrical signal in the desired frequency band, said first amplitude corrector having a phase response;

signal inverting means, coupled to the output of said first amplitude corrector, for inverting the electrical signal as a function of time, such that the phase of the inverted electrical signal is pre-distorted in accordance with the inverse of the phase response of said first amplitude corrector, whereby said phase pre-distortion is produced without the difficulty normally associated with direct phase pre-correction;

a second amplitude corrector, coupled to the output of said signal inverting means, for pre-amplifying the time-inverted electrical signal in the desired frequency band, said second amplitude corrector having a phase response which is substantially equivalent to the phase response of said first amplitude corrector; and signal restoring means, coupled to the output of said second amplitude corrector, for restoring the electrical signal to a time uninverted state, whereby phase distortion introduced in the electrical signal by said first amplitude corrector is substantially compensated by phase distortion introduced in the time-inverted electrical signal by said second amplitude corrector.

30. A method of pre-emphasizing an electrical signal in a desired frequency band, without introducing appreciable phase distortion, said method comprising the steps of:

inverting the electrical signal as a function of time;

pre-amplifying the time-inverted electrical signal in the desired frequency band, using a first amplitude corrector having a phase response;

restoring the electrical signal to a time uninverted state, such that the phase of the restored electrical signal is pre-distorted in accordance with the inverse of the phase response of said first amplitude corrector, whereby said phase pre-distortion is produced without the difficulty normally associated with direct phase pre-correction; and pre-amplifying the restored electrical signal in the desired frequency band, using a second amplitude corrector having a phase response which is substantially equivalent to the phase response of said first amplitude corrector, whereby phase distortion introduced in the time-inverted electrical signal by said first amplitude corrector is substantially compensated by phase distortion introduced in the restored electrical signal by said second amplitude corrector.

31. A method of pre-emphasizing an electrical signal in a desired frequency band, without introducing appreciable phase distortion, said method comprising the steps of:

pre-amplifying the electrical signal in the desired frequency band, using a first amplitude corrector having a phase response;

inverting the electrical signal as a function of time, whereby the phase of the inverted electrical signal is pre-distorted in accordance with the inverse of the phase response of said first amplitude corrector, and whereby said phase pre-distortion is produced without the difficulty normally associated with direct phase pre-correction;

pre-amplifying the time-inverted electrical signal in the desired frequency band, using a second amplitude corrector having a phase response which is substantially equivalent to the phase response of said first amplitude corrector; and restoring the electrical signal to a time uninverted state, whereby phase distortion introduced in the electrical signal by said first amplitude corrector is substantially compensated by phase distortion introduced in the time-inverted electrical signal by said second amplitude corrector.

\* \* \* \* \*